United States Patent
Schueler et al.

(10) Patent No.: US 10,475,325 B2
(45) Date of Patent: Nov. 12, 2019

(54) WIRELESS MONITORING SYSTEM

(71) Applicant: SENSO2ME NV, Kasterlee (BE)

(72) Inventors: Johannes Bernardus Schueler, Valdhoven (NL); Wilfried Richard Hortense Philips, Lebbeke (BE); Richard Kleihorst, Kasterlee (BE); Alain Myriam Robert Van Buyten, Knokke-Heist (BE); Stefan Albert Denise Debois, Edegem (BE)

(73) Assignee: SENSO2ME NV, Kasterlee (BE)

( * ) Notice: Subject to any disclaimer, the term of this patent is extended or adjusted under 35 U.S.C. 154(b) by 26 days.

(21) Appl. No.: 15/766,479

(22) PCT Filed: Oct. 7, 2016

(86) PCT No.: PCT/IB2016/056018
§ 371 (c)(1),
(2) Date: Apr. 6, 2018

(87) PCT Pub. No.: WO2017/060867
PCT Pub. Date: Apr. 13, 2017

(65) Prior Publication Data
US 2018/0286213 A1    Oct. 4, 2018

(30) Foreign Application Priority Data
Oct. 7, 2015   (BE) .................................. 2015/5639

(51) Int. Cl.
*G08B 1/08* (2006.01)
*G08B 21/22* (2006.01)
(Continued)

(52) U.S. Cl.
CPC ............ *G08B 21/22* (2013.01); *H04W 8/005* (2013.01); *H04W 52/0216* (2013.01);
(Continued)

(58) Field of Classification Search
CPC .... G08B 21/22; H04L 27/10; H04W 52/0225; H04W 8/005
(Continued)

(56) References Cited

U.S. PATENT DOCUMENTS 7,260,369 B2 *   8/2007   Feher ..................... H04M 11/04
                                                              455/133
2001/0050580 A1   12/2001  O'Toole et al.
(Continued)

FOREIGN PATENT DOCUMENTS

EP        0586230 A2    3/1994
WO     2009132425 A1   11/2009

OTHER PUBLICATIONS

Belgian Search Report from BE Application No. BE 201505639, dated Jun. 10, 2016.
(Continued)

*Primary Examiner* — Toan N Pham
(74) *Attorney, Agent, or Firm* — Workman Nydegger

(57) ABSTRACT

A wireless monitoring system for monitoring at least one person in a building. The wireless monitoring system comprises a data collection device and a plurality of wireless signalling devices working in a star network topology, the data collection device being adapted to wirelessly receive data transmitted from each of the plurality of wireless signalling devices. The signalling devices and the data collection device being adapted to send and receive FSK modulated signals in a predetermined single channel and the signalling devices being adapted to send data packets such as a heartbeat message to the data collection device.

23 Claims, 17 Drawing Sheets

(51) Int. Cl.
*H04W 52/02* (2009.01)
*H04W 8/00* (2009.01)
*H04L 12/44* (2006.01)
*H04L 27/10* (2006.01)

(52) U.S. Cl.
CPC ... *H04W 52/0219* (2013.01); *H04W 52/0225* (2013.01); *H04W 52/0254* (2013.01); *H04L 12/44* (2013.01); *H04L 27/10* (2013.01); *Y02D 70/00* (2018.01); *Y02D 70/1222* (2018.01); *Y02D 70/1224* (2018.01); *Y02D 70/1242* (2018.01); *Y02D 70/142* (2018.01); *Y02D 70/144* (2018.01); *Y02D 70/162* (2018.01); *Y02D 70/166* (2018.01); *Y02D 70/22* (2018.01)

(58) Field of Classification Search
USPC .......... 340/539.1, 539.21, 541, 565
See application file for complete search history.

(56) References Cited

U.S. PATENT DOCUMENTS

| | | |
|---|---|---|
| 2006/0187045 A1 | 8/2006 | Heinze et al. |
| 2010/0054307 A1 | 3/2010 | Strohm |
| 2013/0076523 A1 | 3/2013 | Kwan et al. |
| 2017/0098367 A1* | 4/2017 | M .................. G08B 25/008 |

OTHER PUBLICATIONS

International Preliminary Report on Patentability from PCT Application No. PCT/IB2016/056018, dated Nov. 27, 2017.
International Search Report from PCT Application No. PCT/IB2016/056018, dated Jan. 18, 2017.

\* cited by examiner

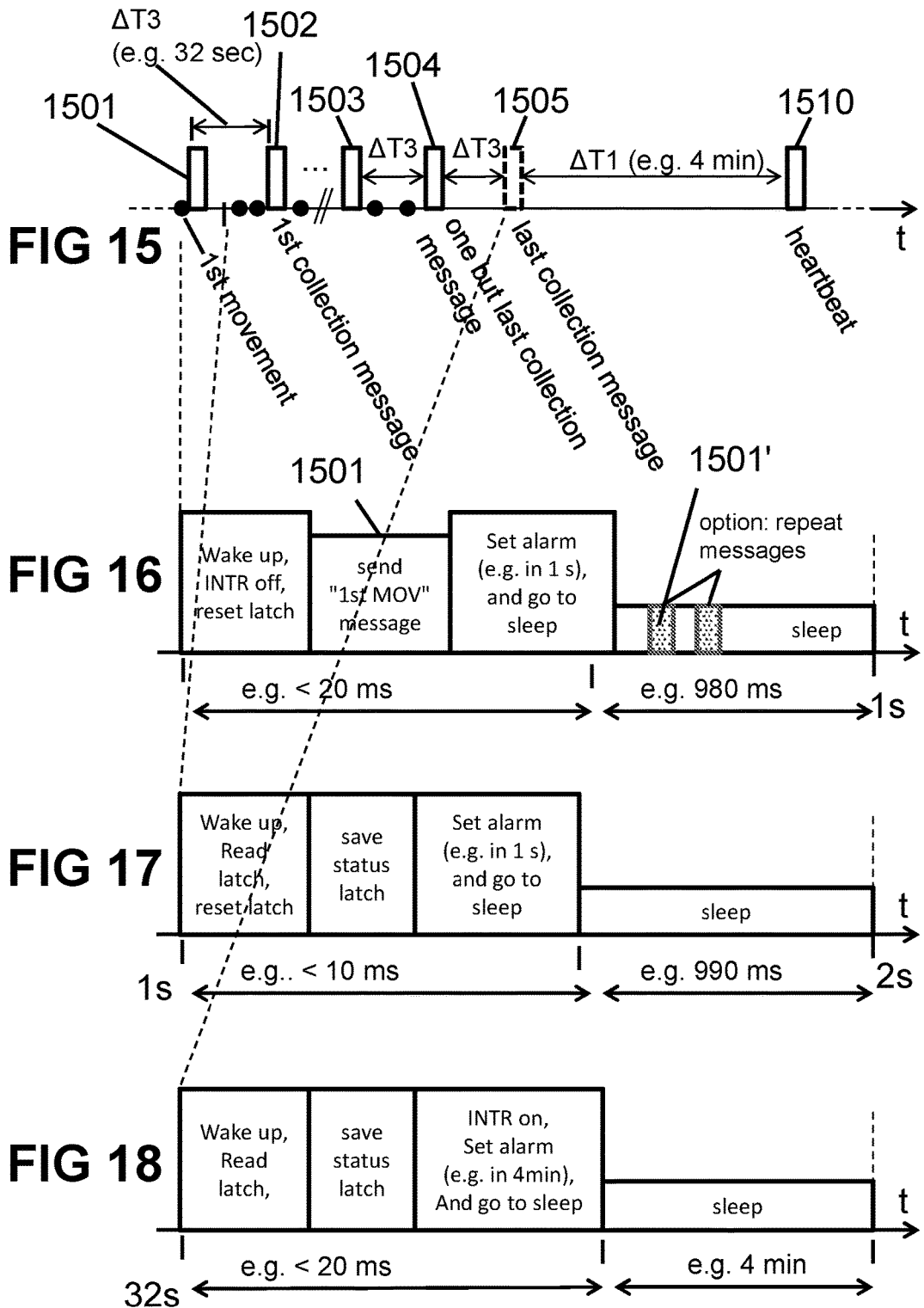

WIRELESS MONITORING SYSTEM

FIELD OF THE INVENTION

The present invention relates generally to the field of wireless monitoring systems, in particular for the monitoring of one or more persons in one or more buildings. More specifically, the present invention relates to a mobility monitoring system, and a wireless signalling device and a data collection device that can be used in such systems.

BACKGROUND OF THE INVENTION

Wireless network systems, for example, wireless communication systems or wireless sensor systems, where a plurality of transmission units send data to one or more receiver units by means of wireless signals, are known in the prior art.

They can be classified in various ways, including, based on the nature of the wireless signals (optical, acoustic, electromagnetic, etc.). For the present invention only RF signals are relevant. There are many different modulation techniques, each with their own specific advantages and disadvantages. For example, amplitude modulation (AM) is highly suited for sending low-frequency analogue signals (for example, speech or sound), and QPSK is highly suited for sending/receiving digital satellite signals, and QAM is highly suited for sending/receiving digital signals over a coaxial cable, etc., but there are plenty of other modulation techniques.

The frequency band in which is communicated is also important. It is known that the electromagnetic spectrum is strongly regulated and the frequency spectrum is divided into different frequency bands, which are assigned to specific applications. For the present invention, the ISM bands are particularly relevant, and particularly the so-called 433 MHz band, the 784 MHz band in China, the 868 MHz band in Europe, and the 915 MHz band in the US and Australia.

Different standards make use of communication in the ISM band, for example, WiFi, ZigBee and Bluetooth, and all use some form of frequency spread (spread spectrum). For example, WiFi and Bluetooth use 'Frequency Hopping Spread Spectrum' while ZigBee uses 'Direct Spread Spectrum'. The bandwidth of channels in Bluetooth is about 1 MHz, and ZigBee-based networks use a bandwidth of 0.3 MHz, 0.6 MHz or 2 MHz, depending on the frequency where in which these networks communicate.

Radio network configurations can be classified into two broad categories: (a) so-called 'star networks', wherein each transmission unit communicates directly with one single receiver unit, and (b) 'mesh networks', wherein some of the transmission units also act as receivers, and can pass on signals. Such units are also referred to as 'signal amplifiers' (or repeaters). Mesh networks are extremely popular with wireless sensor networks. However, the protocol stack of such systems can be very complicated. The most well-known protocol stack is probably 'ZigBee'.

Wireless network systems can be further classified depending on their power supply. For example, ZigBee and Bluetooth are specially designed for low power consumption, which makes these technologies useful for applications with battery power supply.

US20100054307 describes a system for the monitoring of events. The system includes a sensor, a wireless transceiver connected to the sensor, and a base unit with a transceiver that selectively communicates with the sensor units. The sensor units periodically send out a message to the base unit, which is confirmed by the base unit.

There is always room for improvement and alternatives.

SUMMARY OF THE INVENTION

It is an aim of embodiments of the present invention to provide a wireless monitoring system for the monitoring of one or more persons in one or more buildings.

It is an aim of particular embodiments of the present invention to provide such a wireless monitoring system, which is very energy efficient (for example, wherein every wireless signalling device has an average consumption of less than 10 mW), and has a relatively large range (for example, at least 50 m in open air), and high reliability (for example, a bit error rate of less than 1% on the 'physical layer').

It is an aim of specific embodiments of the present invention to provide a presence detection system for detecting the presence of one or more persons in one or more buildings.

It is an aim of specific embodiments of the present invention to provide a mobility monitoring system for monitoring the mobility of one person in one building.

The above aims are achieved by systems and devices according to the present invention.

In a first aspect, the present invention relates to a wireless monitoring system for the monitoring of at least one person in a building, the wireless monitoring system comprising: a data collection device and a plurality of wireless signalling devices working in a star network topology, the data collection device being adapted to wirelessly receive data from each of the plurality of wireless signalling devices. The data collection device may comprise, for example, the following: a programmable controller adapted to execute a program from a first memory; an RF circuit suitable for receiving wireless data from each of the wireless signalling devices; a second memory connected to the controller to store data at least temporarily. Each of the plurality of wireless signalling devices is suitable for transmitting data wirelessly to the data collection device. In embodiments of the present invention, the wireless signalling devices comprise, for example, the following: a programmable microcontroller adapted to execute a program from a memory, the microcontroller having a sleep mode, and a watchdog timer to wake up the microcontroller from sleep mode; an RF circuit adapted to send data wirelessly to the data collection device; a local battery for power supply; a unique identification value stored in a non-volatile memory. In embodiments of the present invention, the signalling devices and the data collection device are adapted to send and receive FSK modulated signals, respectively, in a predetermined single channel. The data collection device can comprise, for example, a control circuit that is adapted to receive signals with at least an output power in the range from −80 dBm to −30 dBm, and is able to set within 10 ms. In embodiments of the present invention, the RF circuit of each of the wireless signalling devices is adapted to send FSK modulated signals in the predetermined single channel. In embodiments of the present invention, the wireless signal generators comprise a microcontroller that is programmed to set the watchdog timer to periodically wake up after a predefined first time period, and once it has been woken up by the watchdog timer, send a data packet to the data collection device as a heartbeat message, the data packet having a sync pattern and the unique identification value.

As far as known to the inventors, the combination of a star network and FSK modulation on a single channel (without frequency hopping) is not known.

It is an advantage that each of the wireless signalling devices send so-called 'heartbeat messages' to the data collection device at repeated points in time, because this allows the data collection device to detect the presence of wireless signalling devices that are within its receiving range, without the wearer having to press a button or the like. In a preferred embodiment, the first time period, is a period in the range of 1 minute to 10 minutes, for example, approximately 2 minutes, or approximately 4 minutes, or approximately 6 minutes, or approximately 8 minutes, but the system will also work with other values. The shorter this period, the less long the battery will last. The greater this period, the longer the battery will last, but the less accurate the duration of the presence can be detected.

It is an advantage that each of these wireless signalling devices has a unique identification value, and that this value is sent along with the heartbeat messages. This allows the data collection device (or another device such as a server to which the data is sent) to identify which of the wireless signalling devices has sent a data packet. Depending on the application, 'unique' means that it must be possible to distinguish the signalling device within a single star network, or across multiple star networks. In a preferred embodiment, all signalling devices have a truly unique number (for example, a 48-bit MAC address).

It is an advantage of embodiments of the present invention that a star network topology is used, in the place of, for example, a tree topology or a mesh topology, because in this way it can be avoided that at least some of the wireless signalling devices must have an RF receiver. This allows the design and the software of all signalling devices to be the same, and the hardware to be simpler and cheaper. But most of all, none of the signalling devices need to have RF receiving functionality, as a result of which all signalling devices can be kept in sleep mode as much as possible (in other words, no repeaters are needed). As a result, message traffic is reduced, and power use is thus also reduced, and battery life increased. This in turn allows the number of repeat transmissions to be reduced (for a fixed, predetermined bit error rate, BER), and the robustness of the system increases, despite the fact that messages are not confirmed (because of one-way communication).

It is a further advantage of a star network that the system will continue to function even if one of the wireless signalling devices is faulty.

The use of a star network setup also offers the advantage that each of the wireless signalling devices communicates directly with the data collection device, without an intermediate node, causing delay of messages to be avoided.

It is an advantage of embodiments of the present invention that FSK modulation is used, instead of another modulation technique, such as, for example, ASK, because it allows a message with a given length (number of bits) to be transmitted in less time (reducing the amount of energy required), or instead of, for example, QPSK or QAM, because it requires less complex (and thus cheaper) hardware.

It is an advantage of embodiments of the present invention that the microcontroller has a sleep mode (in which it typically consumes, on average, less than 5.0 mW, for example, less than 3.0 mW, or less than 2.0 mW, or even, on average, less than 1.0 mW, or even, on average, less than 0.60 mW, or even, on average, less than 0.45 mW).

It is an advantage of embodiments of the present invention that a single communication channel is used, i.e., a fixed (admittedly adjustable) narrowband range in the frequency spectrum (for example, less than 200 kHz wide, or even less than 150 kHz, or even less than 100 kHz), as opposed to frequency hopping, where several different channels of the frequency spectrum are used at different times. While the absolute carrier frequency of this channel is preferably adjustable in a non-volatile memory, typically this will only take place upon installation of the system, and is normally no longer changed over the lifetime of the system. An advantage of using a single communication channel in combination with FSK modulation is that the required bandwidth is very small, so the risk of outside interference or disturbance is smaller, and so communication is more reliable. A disadvantage of using a single communication channel (or a single carrier frequency) is that the risk of collision with signalling devices of the same star network increases, but this risk can be mediated in other ways, for example, by repeating urgent messages one or more times, and, for example, by grouping the data of less urgent messages, and sending them in bursts (albeit with some delay). Depending on the application (presence detection system, or motion detection system, or mobility monitoring system), other considerations could be taken into account.

Using a single channel further allows the wireless signalling device to start sending data very quickly after waking up (for example, in the order of 2.0 ms), because the signalling device knows in advance at what frequency it should transmit. In addition, it can assume that the RF receiver of the data collection device will 100% of the time be listening on that channel. In this way, the amount of time during which the RF transmitter must be supplied with power can be kept very limited, thus further increasing the sleep time, thus further reducing the average energy consumption of the signalling devices.

It is an advantage that the control circuit (with PLL and AGC) of the RF receiver of the data collection device is particularly fast, and in particular settles in less than 10 ms. This furthermore allows the wireless signalling devices to send a very short synchronization pattern (for example, less than 128 bits, for example, less than 96 bits, preferably less than 80 bits, for example, 64 bits) prior to the actual data (for example, the unique ID), so that the necessary transmission time can again be reduced, so that the signalling device can put in sleep mode again as soon as possible.

It is an advantage of embodiments of the present invention that the signalling devices are battery powered devices, because such devices need no power cable or outlet, and so can be placed at almost any location in the building (in the event of, for example, motion detectors), or can be worn by persons. The data collection device is usually equipped with a mains power supply, but can contain an emergency battery if desired.

It is an advantage of embodiments of the present invention that the control circuit (with PLL and AGC, automatic gain control) of the RF receiver of the data collection device allows signals to be received with strongly differing power ranges between the different signalling devices, in particular, in the range of at least −80 dBm to −30 dBm, or, in preferred embodiments, even −90 dBm to −30 dBm, or even −100 dBm to −30 dBm, or even −100 dBm to −20 dBm, or even −100 dBm to −15 dBm. This means that (in typical brick houses or flats or office buildings or the like) the wireless signalling devices can be detected well up to a distance of, for example, 40 m indoors, or even up to 100 m outdoors, even without signal repeaters being needed, while the communication of the different signalling devices to the data collection device is still very reliable, for example, with a typical bit error rate (BER) on the physical layer of 1.0% at most, preferably at most 0.50%, or less than 0.20%, or even less than 0.10%, or even lower still (assuming there is no jammer on the chosen frequency). If a checksum is taken into account, the bit error rate is several orders of magnitude lower still. In practice, this means that persons wearing signalling devices will be detectable in virtually every area of a typical building, even in the garden. For signalling devices that are placed in the house (for example, in a fixed room), this means that they can be placed almost anywhere in the building (for example, house), or even in the garden.

It is an important advantage that the average energy of the radiation emitted by the signalling devices is multiple orders of magnitude, for example, more than 1,000 (one thousand) times, or even more than 10,000 (ten thousand) times, or even more than 100,000 (one hundred thousand) times lower than the radiation emitted by a mobile phone during a telephone conversation. There is therefore absolutely no need to worry about health risks due to radiation from the signalling devices.

It is an advantage that the data packet has a synchronization pattern, because this allows the RF circuit of the data collection device to reliably detect data packets, even if they are sent from multiple signalling devices with an unsynchronised clock.

In an embodiment, each signalling device has a transceiver. For each signalling device, it may be the case, for example, that a maximum of ⅓ of the messages exchanged between the RF circuit of the relevant signalling device and the RF circuit of the data collection device are messages that are transmitted by the data collection device to the signalling device.

It is an advantage of the present invention that it does not work according to the ZigBee protocol or LoRa (Long Range) protocol, but according to its own protocol, in which the signalling devices do not have to check whether a signal is sent to the appropriate signalling device after each message. In other words, this means that the receiving portion of such a transceiver is activated less often than the transmitter, whereby power is saved. Preferably, only up to ⅒ or 1/20 or 1/50 of the messages that are sent are messages that are sent from the data collection device to the signalling devices.

In an embodiment, each signalling device is adapted to only send messages via its RF circuit, and to not receive any messages via its RF circuit.

It is an advantage of embodiments of the present invention that the wireless signalling devices are adapted to only send data to the data collection device, but not to receive it, and that preferably the data collection device is also adapted to only receive data from the wireless signalling devices, but not to send it, via the respective RF circuits. This allows the RF circuit of the signalling device to only act as 'transmitter' and that the RF circuit of the data collection device only acts as 'receiver' and that therefore no transceivers are required. This has the advantage that the wireless signalling devices consume no power to receive messages (by listening on the channel), and that the wireless signalling devices do not need an AGC (automatic gain control) circuit (just a PLL), and that the microcontroller of the wireless signalling devices need not be adapted to sync with an external clock signal, but can operate only on the basis of an internal clock.

It is an advantage that at least a portion of the RF circuit is only supplied with power when data actually needs to be sent, whereby energy is saved, and the battery will last longer.

In an embodiment, the data collection device is further provided with means to determine a signal strength of the signals sent by the signalling devices.

The signal strength can, for example, be determined by reading out the value of the gain of the AGC circuit. This value can provide useful information, depending on the application.

For example, in the case of a presence detection system in an area with several buildings, each building having a wireless monitoring system as described above, each with a data collection device (and assuming the signalling devices are known, for example, by pairing with both data collection devices), then it is possible to determine whether a particular person is in the first or the second building, even when both data collection devices are receiving the heartbeat message, by making use of the signal strength.

For example, in the case of a mobility monitoring system in which at least some of the signalling devices are movement sensors, which need to be set up in a particular room, by measuring the signal strength, and comparing it to a previously measured value of the same signalling device (with the same ID), the system can detect that a certain wireless signalling device was physically moved. This is, for example, very useful information for analysis software that needs to analyze the data. This is all the more important when the signalling devices are not attached permanently to a wall or the like.

In an embodiment, the building has multiple rooms, and at least some of the signalling devices include a movement sensor, adapted to detect a movement, and when a movement is detected, to send a movement signal to the microcontroller, which in turn sends a data packet to the data collection device to report this movement.

Such a monitoring system is especially suited for monitoring one person in a building with multiple rooms. If each room is equipped with a signalling device with a movement sensor, the system can determine in which room the monitored person is located.

It is an advantage of embodiments of the present invention that this movement is reported to the data collection device very quickly and very reliably (typically with a temporal resolution of less than 1 s), and that the system has a very low power consumption.

In an embodiment, at least some of the signalling devices further include a push-button, adapted to provide a push-button signal to the microcontroller, and the microcontroller is adapted to, when the push-button is pressed, send a data packet to the data collection device to register the pressing of the push-button.

Such a push-button is especially suited for wirelessly sending an alarm signal to the monitoring system, for example, if an older person has fallen, where the system can send the message on to a display device (for example, the smartphone of a family member or caregiver), who can then take appropriate action.

In an embodiment, the data packet further includes a checksum, and the controller of the data collection device is adapted to verify the checksum, and if the checksum is incorrect, ignore the message.

It is an advantage to use a checksum because it allows checking if the data of a packet has been received without error, or whether the packet is damaged, for example by external interference or collision if multiple signalling devices wish to transmit simultaneously.

In an embodiment, the control circuit of the RF circuit comprises a PLL circuit and an AGC circuit. This circuit can, for example, be adapted to settle in less than 5.0 ms, for signal levels varying in the range −80 dBm to −30 dBm.

It is an advantage of the present invention that a fixed (possibly adjustable) frequency is used. This allows a fixed value (factor) to be sent to the PLL circuit, in order to generate the carrier frequency in both the transmitters and the receivers. The PLL circuit of the transmitter remains set to this fixed value, and does not need to be adjusted. The PLL circuit of the receiver does need to readjust slightly. Typically, a PLL circuit can readjust in a range of at least approximately 20 kHz to approximately 500 kHz around the set carrier frequency.

It is an advantage that a 'fast' or 'ultra-fast' RF control circuit is used, which is able to find a stable gain within 5.0 ms, preferably within 3.0 ms, preferably within 2.5 ms, or even within 2.0 ms, or even within 1.5 ms, or even within 1.0 ms, for signals that have a power that may vary with different orders of magnitude, particularly in the range −80 dBm to −30 dBm, because, the faster the AGC can find a stable value, the shorter the synchronization pattern can be, and as a result, the shorter the data packet to be sent can be, allowing the RF circuit of the signalling device to be activated less long in order to send particular useful data. In this way, the power consumption of the wireless signalling devices can be further reduced.

In preferred embodiments, the AGC can reach a stable value within 1.0 ms for signals in the range of −95 dBm to −20 dBm, or even −100 dBm to −20 dBm, for a FSK carrier frequency which can vary over a range of 70 kHz.

In embodiments of the present invention, the signalling device is adapted to repeat urgent data packets one or more times.

In an embodiment, the wireless signalling devices are adapted to send data at a bit rate in the range of 4,800 to 38,400 bits/s, preferably 9,600 bit/s or 19,200 bit/s.

It is an advantage to use a bit rate in this range because these are standard bit rates, which can easily be sent by hardware (in the signalling devices) and can easily be received (in the data collection device). A higher bit rate allows the data packet to be sent in a shorter time, as a result of which the RF circuit can be switched off sooner, as a result of which energy consumption is reduced, and therefore also the risk of collisions of packets originating from different signalling devices. A lower baud speed offers more time to detect every bit, as a result of which the BER (bit error rate) for a given power is reduced, but the chance of collisions increases. A person skilled in the art can take a suitable decision. Tests have shown that a bit rate of 9600 baud gives very good results for the intended applications. At a bit rate of 4,800 bit/s, a typical open-air receiving range is in the order of about 200 m to 400 m. At a bit rate of 19,200 bit/s, the open-air receiving range is typically in the order of about 50 m to 100 m. Indoors, the range is somewhat smaller because the signals need to penetrate walls, but the damping is very acceptable in the 433 MHz ISM band, or the 868 MHz ISM band, or the 915 MHz ISM band.

In one embodiment, the data collection device further includes a real-time clock, and the controller of the data collection device is further adapted to apply a timestamp to the received data packets, based on a value obtained from the real-time clock, and the controller is further adapted to store the time-stamped data packets at least temporarily in a memory or database.

By making use of a real-time clock on the data collection device, no real-time clock is required in the wireless signalling devices, reducing system costs.

Furthermore, synchronization errors because of the plurality of individual real-time clocks (one in each wireless signalling device) are avoided.

It is an advantage to provide the received data packets with a timestamp before storing them in a memory (either temporarily or permanently), because this allows movement events to be stored in a file or database or the like, and the ability to afterwards determine when these events took place.

In an embodiment, time measurements of the wireless signalling devices are based on a local RC clock.

It is an advantage that time measurements in the microcontrollers (for example, to determine when it needs to wake up to send a heartbeat message) of the wireless signalling devices are based on an RC clock, because this is sufficiently precise (in terms of ppm) for relatively low bit rates to be detected reliably, and at the same time to consume very little energy, and consequently ideal to be used as a clock signal for a watchdog timer.

A further advantage of basing the time measurement of the microcontrollers of the different signalling devices is that the local clocks generated by the individual RC oscillators of each wireless signalling device are not very accurate and typically deviate by more than 1,000 ppm. While this is highly undesirable for many applications, as it will cause the different signalling devices to run asynchronously, this is very desirable in the present application, because it further reduces the risk of collisions, among other reasons, because the heartbeat messages are sent periodically, and should two such messages of two different signalling devices coincide (collide), the chance that the next and any subsequent messages will also coincide will be extremely small due to the asynchronous RC clocks.

In an embodiment, the wireless signalling device further has a plurality of customizable settings, including a room type to indicate what kind of room a particular wireless signalling device should be set up in.

In certain applications (for example, in a monitoring system for the monitoring of one person in a house), it is useful or important to know in which room the person is staying and how long, and when he/she enters or leaves the room.

The room type can, for example, be encoded with 3 bits (to indicate 1 out of 8 possible room types), or 4 bits (to indicate 1 out of 16 possible room types), or more than 4 bits, for example, 6 bits (1 out of 64 possible room types).

In an embodiment, the adjustable room type is defined by means of dip switches.

The room type can, for example, be encoded by 3 or 4 or 5 or 6 or more than 6 bits, and the value of each bit can, for example, be set by a position of one of the dip switches.

The dip switches can, for example, be used together with one or more resistors, and can be configured to provide a digital or analogue value to the microcontroller via one or more pins thereof, for example, by pulling a number of GPIO pins ('general purpose input/output' pins, i.e. pins for general application) HIGH or LOW, or by forming a ladder network to generate a certain analogue value that can be read by an A/D converter of the microcontroller, and which can then be converted into a digital value with multiple bits. The ladder network can in turn be fed by output pin of the microcontroller that is pulled HIGH in order to function as power supply, but which is only pulled HIGH when reading the configuration. In this way energy can once again be saved.

It is an advantage that dip switches take up only a small amount of space on a PCB (typically in the order of 1 cm$^2$), and that they can easily be fixed in a particular position. When dip switches are used, the housing of the wireless signalling device is usually provided with a movable lid, to simplify access.

It is an advantage of dip switches over other techniques to change settings, for example, a so-called NFC receiver circuit ('Near Field Communication'), or an IR (infra-red receiver port), or the like, that no second apparatus is needed with, for example, an IR transmitter or an NFC transmitter.

In an embodiment, a value of the adjustable room type is defined by a plurality of bits in a non-volatile memory, and the wireless signalling devices further include an NFC-circuit for changing values in that non-volatile memory, and the microcontroller of the wireless signalling devices is adapted to read out the room type from the non-volatile memory, and to send this value along with the data packets.

It is an advantage to use a Near Field Communication (NFC) circuit and a non-volatile memory, as it allows that the customizable settings are written (or updated) without making physical contact with the wireless signalling devices. This will reduce the risk of, among other things, damage by, for example, ESD (electrostatic discharge).

This furthermore allows the closure of the wireless signalling device to be mainly closed, for example, watertight. This in turn offers the advantage that the risk of the device being damaged by, for example, water or another liquid being spilled on the signalling device, is reduced or even completely eliminated.

It is a further advantage to use a Near Field Communication (NFC) circuit and a non-volatile memory, as it allows the non-volatile memory to be erased and/or overwritten without consuming energy of the local battery, so the life of the local battery will not be adversely affected by the initialization procedure of the device, in particular while setting or changing the room type.

In a preferred embodiment, the non-volatile memory is a dual port EEPROM which is, on the one hand, accessible by a processor that is embedded in the NFC circuit, and on the other hand, accessible by the microcontroller of the wireless signalling device.

In an embodiment, the single channel is a predetermined portion of an ISM band, with a bandwidth smaller than 200 kHz.

In preferred embodiments, the single channel has a bandwidth of less than 150 kHz, or even less than 100 kHz, for example, approximately 70 kHz plus or minus 5 kHz.

It is an advantage that no license is required when using the ISM band.

For the present invention, in particular the 433 MHz band, the 784 MHz band (for example, in China), the 868 MHz band (for example, in Europe), and the 915 MHz band (for example, in the US and Australia) are relevant, because the signals must be able to penetrate through walls.

It is a particular advantage of using the 433 MHz band that the corresponding RF signals are little obstructed by the walls of a typical brick house, although a relatively long antenna is required for this (in the order of 25 mm to 35 mm).

In an embodiment, the RF circuit of each of the wireless signalling devices contains a crystal to generate the carrier frequency.

Standard available crystals have a deviation of approximately 100 ppm, or approximately 50 ppm of their nominal (or rated) value, which is much more accurate than the frequency provided by an RC oscillator of the microcontroller.

Use of a crystal allows the carrier frequency to be determined quite accurately, as a result of which the RF receiver of the data collection device has to 'search' for signals in a smaller range (typically determined by a PLL).

The more accurate the carrier frequency, the smaller the range that the PLL (of the receiver) needs to scan, the faster the PLL can lock, the shorter the sync pattern can be, the shorter the message can be, the faster the RF transmitter can be switched off, which will ultimately result in faster transmission, and further energy savings.

It is noted that the crystal is part of the RF transmitter, and is consequently also switched on/off along with the rest of the RF transmitter. It therefore does not need to be permanently supplied with power.

In one embodiment, the crystals of the RF circuits of each of the wireless signalling devices have a deviation of up to approximately 30 ppm or at most approximately 10 ppm compared to its nominal value.

In preferred embodiments of the present invention, a crystal with a deviation of up to approximately 30 ppm is used. Such crystals are commercially available, and are typically used for clock applications (for example, alarm clocks). Even more preferred is the use of crystals with a deviation of no more than approximately 10 ppm. It is an advantage of using such a crystal that the formed carrier frequency (in the 433 MHz, 868 MHz and 915 MHz band) offers an absolute accuracy of approximately 4 kHz, approximately 8 kHz and approximately 9 kHz, respectively. This allows the PLL of the RF receiver of the data collection device to settle very quickly (in the order of less than 1.0 ms).

It is an advantage that the total RF bandwidth in which the RF receiver of the data collection device has to search is as small as possible, because this increases the detection speed, and also that it reduces the risk of external disturbances (for example, by other devices that communicate over the ISM band, for example, using standards such as ZigBee or LoRa, with frequency hopping).

In preferred embodiments, a crystal of 25,000 MHz and approximately 10 ppm is used in the RF circuit of both the signalling devices and the RF circuit of the data collection device.

In an embodiment, the microcontroller of the wireless signalling device is further adapted to measure a value of the local battery, and to send a value related to this measured value of the battery along in at least some heartbeat messages.

It is an advantage to send along an indication of the local battery status in at least some of these heartbeat messages, so that the data collection device can check whether the battery has enough capacity. This allows the system to give the user a warning (for example, an email or SMS or any other type of message or warning) that the battery is low. The measured value can be a battery voltage, and the value related to this can, for example, be a digitized value thereof, or a scaled and/or a further quantised version of it.

In an embodiment, the wireless signalling device further comprises a light sensor, and the microcontroller of the wireless signalling device is further adapted to read out a light intensity value from the light sensor, and to send a value related to the light intensity value to the data collection device.

It is an advantage to use wireless signalling devices that have a light sensor, for example, a visible light detector or daylight sensor or the like, because this allows the monitoring system to detect, for example, whether a light is switched on during the night in a particular room. This makes it possible, for example, to determine whether a person has gone to the bathroom during the night, without compromising their privacy.

Preferably, the light sensor is only read out if movement was also detected, for example, if the microcontroller was woken up by the watchdog timer, and preferably a value related to the measured value (e.g. a digital version thereof, whether or not scaled) is sent along in messages that also contain movement information.

It is an advantage of embodiments that the light sensor is only supplied with voltage or current if a readout thereof is needed. Consequently, light sensor will not significantly tax the battery.

It is handy to send the light-related value in data packets that report movement, because it is especially relevant to know if there was light in the room in the event of movement.

In an embodiment, the wireless signalling device further comprises a temperature sensor, and the microcontroller of the wireless signalling device is further adapted to read out a temperature value from the temperature sensor, and to send a value related to the temperature value to the data collection device.

It is an advantage of wireless signalling devices that also include a temperature sensor that this also allows the temperature in a particular room to be monitored. After all, the behaviour of the person being monitored may depend on the temperature in the room (for example, poor sleep may be due to a too low or too high temperature in the bedroom).

Although it is not the main aim of the present invention, the temperature sensor can also be used to detect a fire in a particular room.

It is handy to send along the temperature-related value in data packets that report movement, and/or in heartbeat messages, because the temperature usually does not change rapidly.

In an embodiment, the wireless signalling device further comprises an housing that contains a printed circuit board (PCB), and the PCB includes at least the microcontroller and the RF circuit.

If present, the PCB preferably also contains the movement sensor, and/or the push-button, and/or the light sensor, and/or the temperature sensor, and/or an NFC circuit with a processor, a coil, and an EEPROM (for example, a dual port EEPROM).

In an embodiment, the housing of the wireless signalling device includes a battery that cannot be replaced in a mechanical manner, and the housing is permanently closed.

It is an advantage of a permanently closed housing, for example, a waterproof housing, that the risk of damage from contact with components, and/or by contact with a liquid (for example, water or coffee or tea) is minimized or cancelled.

The non-replaceable battery can, for example, be soldered to the PCB.

In an embodiment, the battery is rechargeable, and the housing further includes a charging circuit for the battery. The charging circuit is preferably contactless, for example, by capacitive coupling. Alternatively, a connector can be provided to charge the battery, for example, via an external adapter.

In an embodiment, the battery is not rechargeable. It is an advantage of such a battery that no battery charging circuit is needed to charge the battery, which is advantageous in terms of PCB area, component costs and production costs.

In an embodiment, the PCB is mounted in a movable manner inside the housing, and the movement sensor is mounted on a front side of the PCB and sticks out at least partly past the housing, and the push-button contains a spring, and the push-button is mounted on a back side of the PCB in front of part of the housing, in such a way that, when a force is applied to the movement sensor, the push-button is pressed down, and when no force is applied to the movement detector, the push-button is not pressed down.

It is an advantage of this form of mounting, since it simplifies pressing the push-button (albeit indirectly) because the dimensions (for example, diameter) of the movement sensor are typically much greater than the dimensions (for example, diameter) of the pressable part of the push-button itself. It is a further advantage that as a result of this, other moving parts, such as an extension or the like, can be avoided, which simplifies the assembly of the signalling device.

In an embodiment, the movement sensor is a passive infra-red (PIR) sensor, and the wireless signalling device further comprises a pulse reshaping circuit, arranged between the PIR sensor and the microcontroller, the pulse reshaping circuit being adapted to receive a signal from the PIR sensor in case of a movement event, and adapted to generate a pulse signal to an input pin of the microcontroller, and the microcontroller being adapted, when it is in sleep mode, to wake up when the pulse signal appears on the input pin.

It is an advantage of a PIR sensor that it can detect a movement with a very low power (the PIR sensor itself typically only a few μWatt, the pulse converter typically in the order of 100 to 200 μWatt, for example, approximately 150 μWatt), and that at the same time the privacy of the monitored person is maximally respected, unlike other monitoring devices, with, for example, microphones, cameras, or where it is observed which television programmes are viewed, or which radio programmes are listened to.

It is an advantage of using a pulse reshaping circuit that it can reshape pulses originating from the PIR sensor into a higher signal amplitude, so that the latter can be reliably detected by the microcontroller, which is not the case with the pulses (with low amplitude) from the PIR sensor itself.

It is a particular advantage of using a low-power pulse reshaping circuit (for example, with a consumption of less than 200 μWatt) that the microcontroller does not need to repeatedly read the output of the PIR sensor ('polling'), for example, using an ADC (analogue-to-digital converter), which would require considerable additional power.

It is an advantage of embodiments in which the microcontroller has configured the input pin to interrupt the watchdog timer to wake up the microcontroller when it is in sleep mode. In this way, movements that are detected by the PIR sensor can be reliably reported, even if the microcontroller was in sleep mode.

It is an advantage that the same input pin is also used to actively read out the current state ('polling'), when the interrupt is turned off, which may be advantageous in the period shortly after a 'first movement'.

In an embodiment, the microcontroller is further adapted to send a first movement message to the data collection device to signal the movement event, and the data collection device is adapted to receive that first movement message and to timestamp it before storing it at least temporarily in a memory or database.

'First movement event' means the first movement that is detected by a specific signalling device, since it was in sleep mode, and wherein the interrupt of the input pin connected to the latch (if present) or connected to the pulse reshaping circuit (if the latch is not present), is switched ON. In embodiments of the present invention, this is particularly the case when the microcontroller is coupled to the battery (during manufacturing), or after the expiration of a time window of 32 seconds, during which no motion is detected.

It is an advantage that the 'first movement event', is almost immediately (but guaranteed within 400 ms, preferably within the 200 ms, or even within the 100 ms or even within the 50 ms) transmitted to the data collection device, so that the time when the movement event occurred can be determined precisely.

The packet is subsequently received by the data collection device, and provided with the timestamp, making use of the real-time clock of this device.

In a further embodiment, the 'first movement message' can be sent on to a server and/or to a mobile device of an end-user (for example, a smartphone or tablet of a family member of the person being monitored), where, if desired, the movement event can be displayed almost immediately (within a few seconds). In this way, the owner of the smartphone or tablet (for example, the family member) knows, at any time of the day, in which room the person being monitored is in and for how long.

In an embodiment, the microcontroller is further adapted to transmit at least one additional movement message for reporting the first movement event, with each additional transmission taking place with a predetermined interval (of, for example, 20 ms.) following the transmission of the first movement message; and each additional movement message comprises a first counter or other indication of the total time period between the transmission of the relevant additional movement message and the occurrence of the first movement event; and the data collection device is adapted to receive the additional movement messages and to provide them with a timestamp, and to store them at least temporarily in a memory or database.

In preferred embodiments, the 'first movement event' is reported at least 2 times to the data collection device (for example, 1 original data packet that is sent as soon as possible, plus 1 additional movement message that will be sent later, for example, 20 ms later). Optionally, the packet can be sent a third time after the same period (for example, 20 ms) or a longer time period (for example, 30 ms), or more than three times.

However, it is important that the time period is known in advance (for each counter value), both by the signalling device and the data collection device, which allows the latter (or a server to which the data packets are sent) to calculate back to when the movement event actually took place.

This can be achieved by, for example, repeating each packet one time or several times after a predetermined fixed period of time (for example, 20 ms), and including a field (for example, a counter value) in any repeat messages as an indication of the time difference with respect to the original transmission. The time at which an original message N-1 was sent, but that was lost, can then be calculated from the current message N (for example, to within an accuracy level of 1 ms).

Alternatively, this can also be achieved by including in follow-up messages the useful information of certain messages (for example, the message with the 'first movement event') at least once/at least twice/or more than twice (for example, in heartbeat messages or in 'aggregate messages'), once again with a counter or other indication of the elapsed time with respect to the original message or the original event. In this way, the initial transmission time and the content of at least one/two/more than two consecutive lost packets can be reconstructed.

Based on criteria such as delay and/or battery consumption, a person skilled in the art can decide which of the two repeating systems to use.

It is an advantage that the risk of information loss is reduced by repeating messages, or by also including a copy of the useful information of messages in subsequent (other) packets.

Testing of a system with thirty signalling devices showed that 1 to 2 additional transmissions (also known as repetitions or re-transmissions) in practice produces very reliable results, despite collisions of other packets of the same star network.

Of course, it is also possible to choose a higher number of repetitions (for example, during design or because of the customizable settings), depending on the specific application. For example, the value can be set to a relatively low value (for example, 2) for a detached house, and the value can be set to a higher value (for example, 5) for an apartment building where multiple similar star networks are active.

Alternatively and/or in combination therewith, the carrier frequency of the single channel of these different star networks can also be set differently, so that all wireless signalling devices of a first star network communicate in a first frequency band, and all wireless signalling devices of a second star network communicate in a second frequency band, not overlapping with the first single frequency band, so they do not interfere with each other. Accordingly, the data collection device of the first star network will only search for signals in the first frequency band, and the data collection device of the second star network will only search for signals in the second frequency band. In such a configuration, data packets that are sent by the wireless signalling devices of the first star network may collide with each other, but not with those of the second star network. This is another important advantage of choosing a very narrow frequency band (less than 200 kHz, or less than 150 kHz, for example, approximately 70 kHz) in the ISM band, namely that such a narrow band makes it possible for different star networks to be on another 'single channel', without overlap.

In an embodiment, the pulse reshaping circuit further includes a latch, and the microcontroller is further adapted to, after sending the last sent additional movement message, switch off the interrupt related to the input pin connected to the pulse reshaping circuit, and perform the following steps in a cycle of a predetermined number of iterations (for example, 32 times): * set the watchdog timer to wake up after a second time period (for example, 1 second); * on waking after this second time period, read out the latch and determine whether new movement events have occurred during the past time period, and temporarily store the result of this determination in a memory; * reset the latch again, set the watchdog timer again with the second time period, and then to go back into the sleep mode; and the microcontroller is further adapted to optionally send the collected amount of data together in one aggregate message, and the microcontroller is further adapted to determine whether at least one movement event has taken place in the cycle, and if at least one movement event has occurred, to start a new cycle, and if no movement event has occurred, to reset the watchdog timer with the first time period (for example, 4 minutes), activate the interrupt related to the input pin connected to the pulse reshaping circuit again, and again go into sleep mode.

In an embodiment, the predetermined number of iterations is 32, and the second time period is equal to 1.0 seconds, so that a single cycle takes 32 seconds, but other values can also be selected.

In an illustrative embodiment, the microcontroller monitors consecutive movement events in order to allow verification to take place of whether the person is still present in the same room. However, the exact timing of these movements is not important, only the time that the person was first and last detected each room.

It is an advantage of a hardware latch that it remembers whether a movement event has occurred since the last time that the latch was reset, without the microcontroller constantly needing to check this. This allows the microcontroller to determine whether or not movement events have taken place in the previous time interval (for example, 1 second), even if it was in sleep mode most of this time. In this way, energy can be saved.

It is a further advantage that in the movement event of the past period (for example, 1 second) communication does not immediately take place with the data collection device, but that instead, a predetermined number (for example, 32) of successive detections (i.e. movements over a predetermined time window of, for example, 32 seconds) are grouped together and sent in a single data packet, which again saves a lot of energy.

In preferred embodiments, whether or not movements occur during the entire time window (of, for example, 32 seconds) is recorded with scarcely 32 bits ('1'=movement detected, '0'=no movement detected). This allows for very compact storage, much more compact than would be the case if, for example, 32 clock values would be stored.

Disabling the interrupt boils down to is that the microcontroller is "polling" for a certain time (in the example: However, the hardware latch makes it possible that the microcontroller only needs to read out the latch once per second, to know whether a movement has taken place in the previous second. This in turn allows the microcontroller to remain in the sleep mode for the rest of the second. This yields giant energy savings, without losing relevant movement information.

It is an advantage of this technique that it makes it possible to detect whether the person is still 'moving in the room'.

It is an advantage that this technique allows the time to be recorded fairly accurately (within a predetermined tolerance margin, in the example above: 1.0 s) of the 'final movement' in a particular room, before entering a different room. This final movement is then the time at which the person leaves the room. This time is sent on to the data collection device (albeit with a delay of, for example, 32 seconds) and is then given a timestamp. On the basis of the final movement in the first room (with a one-second margin of error, derivable from the last bit that was '1', and the timestamp of the arrival of the respective packet in the data collection device), the latter can calculate back (with a one-second margin of error) to when the person left the first room. In the meantime, the 'first' message will also have arrived stating that the person has arrived in the second room, and this message too will be provided with a timestamp. From the time of the final movement in the first room, and the first movement in the second room, it can be determined how much time the person needed to move from the first room to the second room. This time can be used as a 'mobility value'.

It is noted that the transfer of the so-called 'follow-up data' is not instantaneous, but delayed (in the example above, by about 32 seconds if the last packet is also transmitted at the end of the 32 s period, or with a delay of 32 s+4 min. if the data is transmitted only with the next heartbeat packet). That means that the mobility value can only be calculated after some time, but that's no problem for a mobility application, because this time is usually only calculated afterwards and averaged over, for example, a week or a month.

In contrast with this, the wireless signalling device almost immediately sends the 'first' movement detection to the data collection device, which can in turn send it on to one or more mobile devices almost immediately (for example, a tablet or a smartphone), whether or not via a server. This makes it possible to very quickly (usually within 10 seconds) report to the family member which room the relevant person is in, without the delay of 32 s or 4 min.+32 s.

It is a not inconsiderable advantage of the present invention that it allows substantially the same information to be collected (i.e., determine whether there is movement every second), but without having to send a message every second, in combination with the fact that a first movement in a new room is sent almost instantaneously. As far as known to the inventors, this combination has not been applied previously.

In an embodiment, the 'aggregate messages' are sent out only once and not repeated, except the very last packet (see below). This will once again save energy. If the application doesn't need to know whether the person in question is still moving, the intermediate aggregate messages can even be dispensed with completely, causing even more energy to be saved.

In another embodiment, the movement information (but, for example, not the temperature and the like) is repeated in subsequent messages, together with a counter value (or time value). This will again save energy, assuming that the number of messages does not increase, and the messages only become minimally longer.

In an embodiment, the microcontroller of the wireless signalling device is further adapted to send in the heartbeat message the data of the most recent cycle in which a movement event occurred, along with a counter value indicating how often this aggregate data was already sent.

In contrast with the 'first movement message' that is sent almost immediately, and that is repeated at least once to reduce the risk that the first packet gets lost because of a collision, as described above, the aggregate messages are not sent immediately, but with a delay (in the example: 32 s).

Instead of repeating all aggregate messages (to avoid loss by collision), the inventors have chosen to only send the last aggregate data several times (including the last movement), by including it in the heartbeat messages, which should be sent whatever happens. In this way, additional transmissions of each aggregate message are avoided, resulting in lower energy consumption, knowing that a very small number of the aggregate messages will get lost as a result of collision, except the last one.

Thanks to the counter value, the data collection device can determine the time when the last aggregate data was measured (in the example, by subtracting the counter value×4 minutes from the timestamp assigned to the heartbeat message received).

It is an advantage that the system can determine the time of the 'first' and 'last' movement event with very high reliability and fairly accurately (with a one-second margin of error) without needing bi-directional communication between the signalling devices and the collection device, and without sending every message several times (for example, 3 times), and without the wireless signalling devices having a real-time clock, and furthermore with a very low energy consumption, while the first message is still sent almost instantaneously, so that the system always knows which room the person is located in.

In an embodiment, the microcontroller of the wireless signalling device is further adapted to send in the subsequent aggregate message the data from the most recent cycle in which a movement event occurred, together with a counter value that indicates the time relative to the last message.

In contrast with the 'first movement message', which is sent almost immediately, as described above, the aggregate messages are not sent immediately, but with a delay (in the example: 32 s).

It is an advantage of this embodiment that the grouped movement information is repeated at least once, and thus that the aggregate messages (except the first aggregate message) contain at least two groups, and in the example therefore cover a period of 64 s, because this reduces the risk that certain grouped packets will be lost, for example, by disturbance or by collision. Thanks to the counter value (and the known clock period of the microcontroller), the data collection device can calculate the time that each group was measured. This increases the immunity against packet loss through interference. Even more robustness can be achieved by repeating each grouped packet more than once.

In an embodiment, the data collection device comprises a connection for a mains power supply and optionally also a fixed or removable battery.

This battery serves as a spare battery, and may or may not rechargeable.

In a second aspect, the present invention relates to a presence detection system for determining a presence of persons in a building, comprising: a wireless signalling system according to the first aspect; a computer unit provided with software to analyze the heartbeat messages to detect which persons are present in the building, on the basis of a difference between the current time, and the time of the last received heartbeat message.

The computer unit can be the data collection device itself, or another device, for example, a computer or a remote server.

In a third aspect, the present invention relates to a presence detection system for determining a presence of persons in an area with at least two buildings, each building comprising a wireless signalling system according to the first aspect, to the extent that the data collection device is provided with means to determine a signal strength of the signals sent by the signalling devices, so that the presence detection system comprises at least two data collection devices; and a computer unit equipped with software to analyze the heartbeat messages to detect which persons are present in at least one of the two buildings, and if the same heartbeat message is received by the at least two data collection devices, to determine the most probable location taking into account the received signal strengths.

The computer unit can be the data collection device itself, or another device, for example, a computer or a remote server.

In a fourth aspect, the present invention relates to a mobility monitoring system for determining mobility or mobility changes of a person who lives in a building with several rooms, comprising: a wireless monitoring system according to the first aspect; a computer unit equipped with analysis software for the analysis of the movement events detected by the data collection device, the analysis software being adapted to calculate one or more mobility values on the basis of a time difference between a last movement detected by a first wireless signalling device and a first movement detected by a second wireless signalling device, different from the first wireless signalling device; and communication or network means for sending the one or more mobility values to at least one display device.

The analysis software (also referred to as 'data analysis program') is based on the assumption that each wireless signalling device is associated with a particular type of room or space.

Data analysis software in itself is already known in the prior art, but one of the underlying principles of the present invention is the specific way in which the time is calculated that the person needs to move from one room (for example, the living room) to another room (for example, the bedroom). By measuring this time over a longer period (for example, a week, or multiple weeks or multiple months or multiple years), mobility can be measured, but also mobility changes.

It is a specific advantage of the present invention that a mobility value or a change in that value in the course of time can be determined, while at the same time respecting the privacy of the person as much as possible. It is an advantage that the mobility can be determined with high accuracy (for example, approximately up to 1.0 second accurate), thanks to, among other things, the fact that the data packets get a timestamp upon receipt on the data collection system.

In a particular embodiment, the analysis software can define, for example, a row of 12 mobility values, where each value corresponds to the average time it takes to go from one specific room to another specific room, for example, mobility value 1=the average time to go from the living room to the bedroom. Of course, the analysis software will also filter out data when the person did not go straight from the living room to the bedroom, but as mentioned previously, these algorithms are known in the prior art, and are not the main focus of the present invention.

It is an advantage of embodiments of the present invention that the holder of the display device (for example, a family member or a carer) can see where the person is at any moment of the day (and almost immediately), but can also see mobility parameters, and/or mobility changes over time, for example, a mobility improvement of a person who is recovering from an accident, or a mobility deterioration of an older person suffering from hip problems.

The display device can include, for example, a suitable software application, for example, in the form of a so-called 'app', for displaying the data on a graphic display.

In an embodiment, the computer unit is provided with analysis software in the controller of the data collection device, and the data collection device further comprises a database for at least temporarily storing the received data packets, and the data collection device can be connected to the communication or network means, or comprises these.

In this embodiment, the processor of the data collection device stores the data packets in a local database, preferably implemented as a non-volatile memory, for example, a flash memory, and performs the analysis of the data packets itself, without needing the help of an external server. In this case, the data collection device itself communicates with the one or more mobile devices (for example, smartphones, tablets, etc.), for example, using GPRS, UMTS, EDGE, etc.

In an embodiment, the mobility monitoring system further comprises a network server operationally connected to the data collection device, and the network server comprises the computer unit provided with analysis software, and the network server further comprises a database for at least temporarily storing the received data packets, and the network server can be connected to the communication or network means, or comprises these.

In this embodiment, the data collection device itself does not carry out the analysis, but sends the information to a network server. This has the advantage that a more complex algorithm can be used, that can be shared by multiple star networks, without increasing the cost for each data collection device. This also offers the advantage that the data collection device can mainly be concerned with the real-time tasks, especially related to the reception of the data packets.

The operational link between the data collection device and the network server may comprise a wired connection (for example, a coaxial or Ethernet cable) or a wireless connection (for example, via WiFi or GPRS or GSM), or with the aid of a modem connection (for example, a high speed model), or any other type of connection.

The at least one display device can be, for example, a smartphone of a family member or carer. The communication means may, for example, comprise one or more of the following: GPRS, UMTS, etc.

In a fifth aspect, the present invention relates to a kit of parts comprising: a data collection device as defined in the first aspect; and at least one wireless signalling device as defined in the first aspect.

In a sixth aspect, the present invention relates to a wireless signalling device as defined in the first aspect, for use in the mobility monitoring system according to the fourth aspect, the wireless signalling device comprising at least one movement sensor.

It is an advantage of embodiments of this wireless battery-powered signalling device that it can conveniently be used for mobility measurement in a residence of a person without (or with minimal) infringement of the privacy of the person concerned, and that the device can be implemented in a relatively low-cost way (among other reasons, because it requires no RF receiver), and because the signalling device has a very long life (in the order of 2 to 5 years) thanks to the energy-efficient implementation in both hardware and software, and that the device can detect and report movement events fairly accurately (in time), and that the signalling device can be placed at a relatively large distance from the data collection device (in practice, in virtually any room of a typical home or apartment, especially if a frequency band below 500 MHz is used), and that the risk of the loss of messages is negligible.

In other words, it is an ideal sensor for a mobile monitoring system.

In a seventh aspect, the present invention relates to a wireless signalling device as defined in the first aspect, for use in the presence detection system according to the second or third aspect, and/or for use in the mobility monitoring system according to the fourth aspect.

It is an advantage of such a signalling device that it can be constructed very compactly, has a very long lifetime (typically 2-5 years), and makes it possible to detect which person is present at which time, without this person having to do something special (for example, record time, batching, etc.). He only needs to wear his personal signalling device, and all the rest is done automatically.

In an embodiment, the wireless signalling device further comprises at least one push-button.

The wireless push-button device has the same characteristics as the movement sensor, except that it cannot detect movement events, but is intended to allow the person being monitored to press the 'button' in case of an emergency situation. The button-press signal is treated in the same way as the 'first movement detection', namely, a data packet is sent almost immediately to the data collection device, which can send this on to a display device (for example, a mobile phone or smartphone from a family member or a carer), either directly (via the communication means such as GPRS, UMTS, etc.) or via the server, allowing the person to then respond appropriately.

It is an advantage that the system can handle several push-button devices (each with its own ID), as a result of which the presence of a visiting family member who is wearing their push-button device will be automatically detected by the system. This is particularly relevant for the analysis software that in such case can take into account that there are multiple persons in the accommodation.

In an eighth aspect, the present invention relates to a data collection device as defined in the first aspect, for use in the presence detection system according to the second or third aspect, and/or for use in the mobility monitoring system according to the fourth aspect.

Particular and preferred aspects of the invention are set out in the appended independent and dependent claims. Features of the dependent claims may be combined with features of the independent claims and with features of other dependent claims as appropriate and not merely as explicitly set out in the claims.

BRIEF DESCRIPTION OF THE DRAWINGS

FIG. 15 shows an example of a timeline and the times at which a first movement message and subsequently aggregate messages are sent.

FIG. 16 shows in more detail an example of the first second of FIG. 15.

FIG. 17 shows in more detail an example of the second second of FIG. 15.

FIG. 18 shows in more detail an example of a time fragment of FIG. 15, during which the last aggregate message is optionally sent, and normal heartbeat pattern is resumed.

Figure 1:
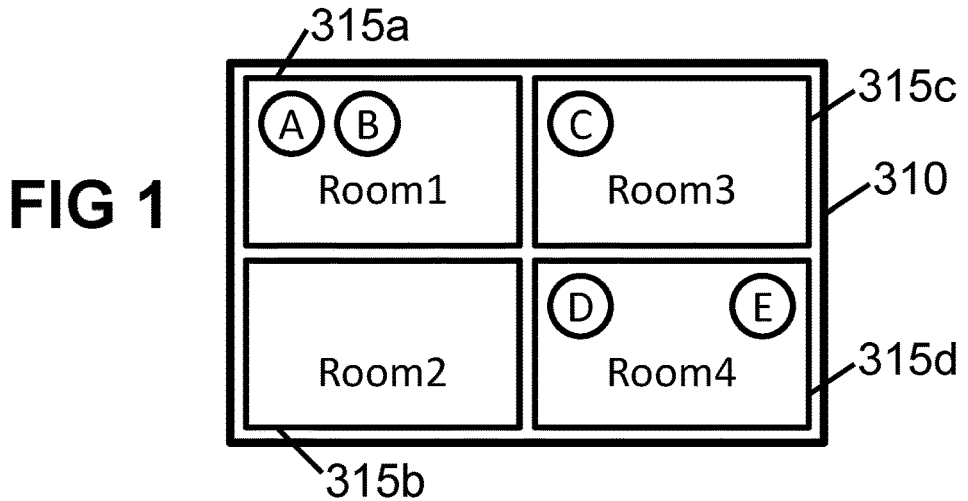
FIG. 1 shows an example of a building with four rooms, in which there are five persons, whose presence should be detected by embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope. In the different drawings, the same reference signs refer to the same or analogous elements.

DETAILED DESCRIPTION OF EMBODIMENTS OF THE INVENTION

Although the present invention will hereinafter be described with respect to particular embodiments and with reference to certain drawings, the invention is not limited thereto but only by the claims.

Reference throughout this specification to 'one embodiment' or 'an embodiment' means that a particular feature, structure or characteristic described in connection with the embodiment is included in at least one embodiment of the present invention. Thus, instances of the phrases 'in one embodiment' or 'in an embodiment' in various places throughout this specification may, but do not necessarily, all refer to the same embodiment. Furthermore, the particular features, structures or characteristics may be combined in any suitable manner, as would be apparent to one of ordinary skill in the art from this disclosure, in one or more embodiments.

Similarly it should be appreciated that in the description of illustrative embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, the terms 'first', 'second' and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms 'top', 'bottom', 'above', 'front' and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term 'comprising', used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression 'a device comprising means A and B' should not be limited to devices consisting only of components A and B. It means that with respect to the present invention, the only relevant components of the device are A and B.

In the description provided herein, numerous specific details are set forth. However, it is understood that embodiments of the invention may be practiced without these specific details. In other instances, well-known methods, structures and techniques have not been shown in detail in order not to obscure an understanding of this description.

Figure 2:
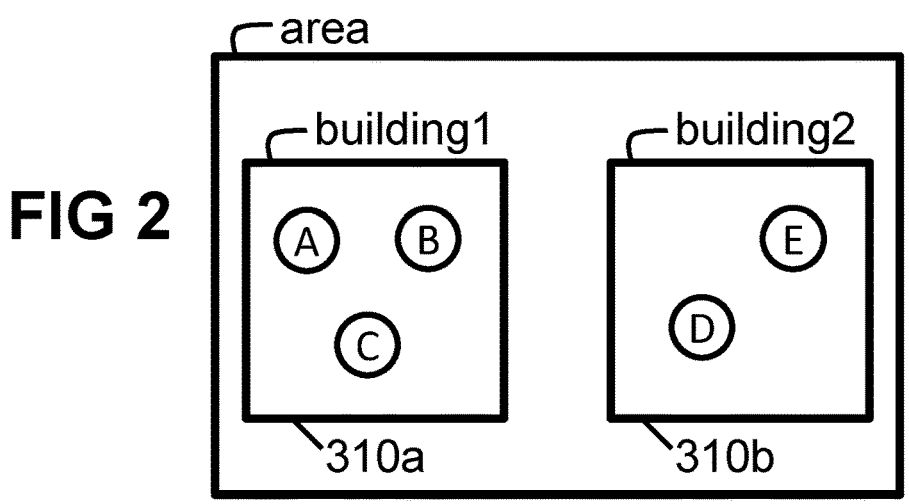
FIG. 2 shows an example of a site with two buildings, in which there are five persons, whose presence should be detected by embodiments of the present invention.
Figure 3:
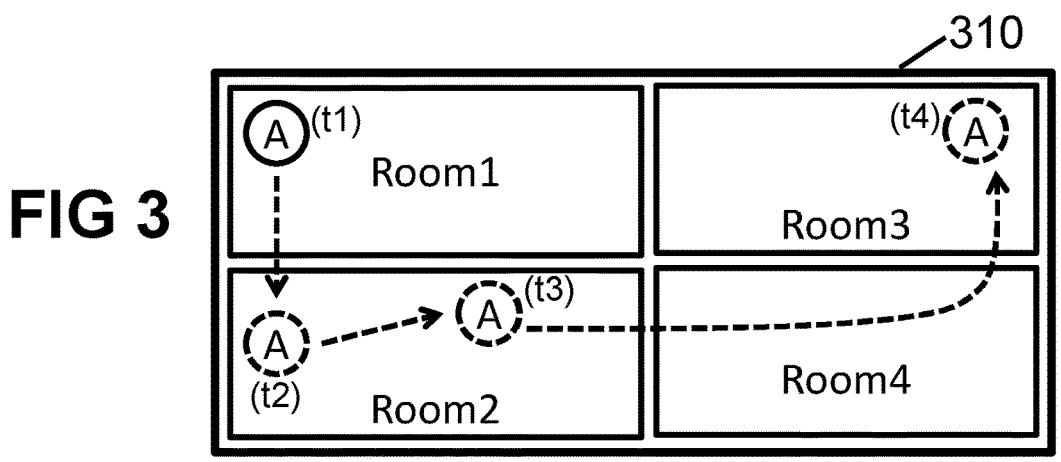
FIG. 3 shows an example of a building with four rooms, in which one person lives, whose presence must be monitored, including which room, and where a mobility should be determined by embodiments according to the present invention.

The inventors were faced with the problem of monitoring one or more persons in one or more buildings 310, as shown schematically in FIG. 1 for five persons A to E in one building 310 having four rooms 315, and in FIG. 2 for five persons (for example, employees) A to E in two buildings 310a, 310b (for example, of a single employer) in an area, or in FIG. 3 for one person in one building 310 with multiple rooms, but the present invention can also be used for other applications.

The application of FIG. 1 focuses mainly on presence detection of the relevant persons in the building, possibly with time registration of when the persons are first and last detected, but it is not important in which room these persons are located. A typical application of this problem is presence detection of workers in a building of the employer. Of course, the presence data can also be used conveniently in other applications, for example, in case of fire, or to detect whether all staff members have left the building.

Figure 4:
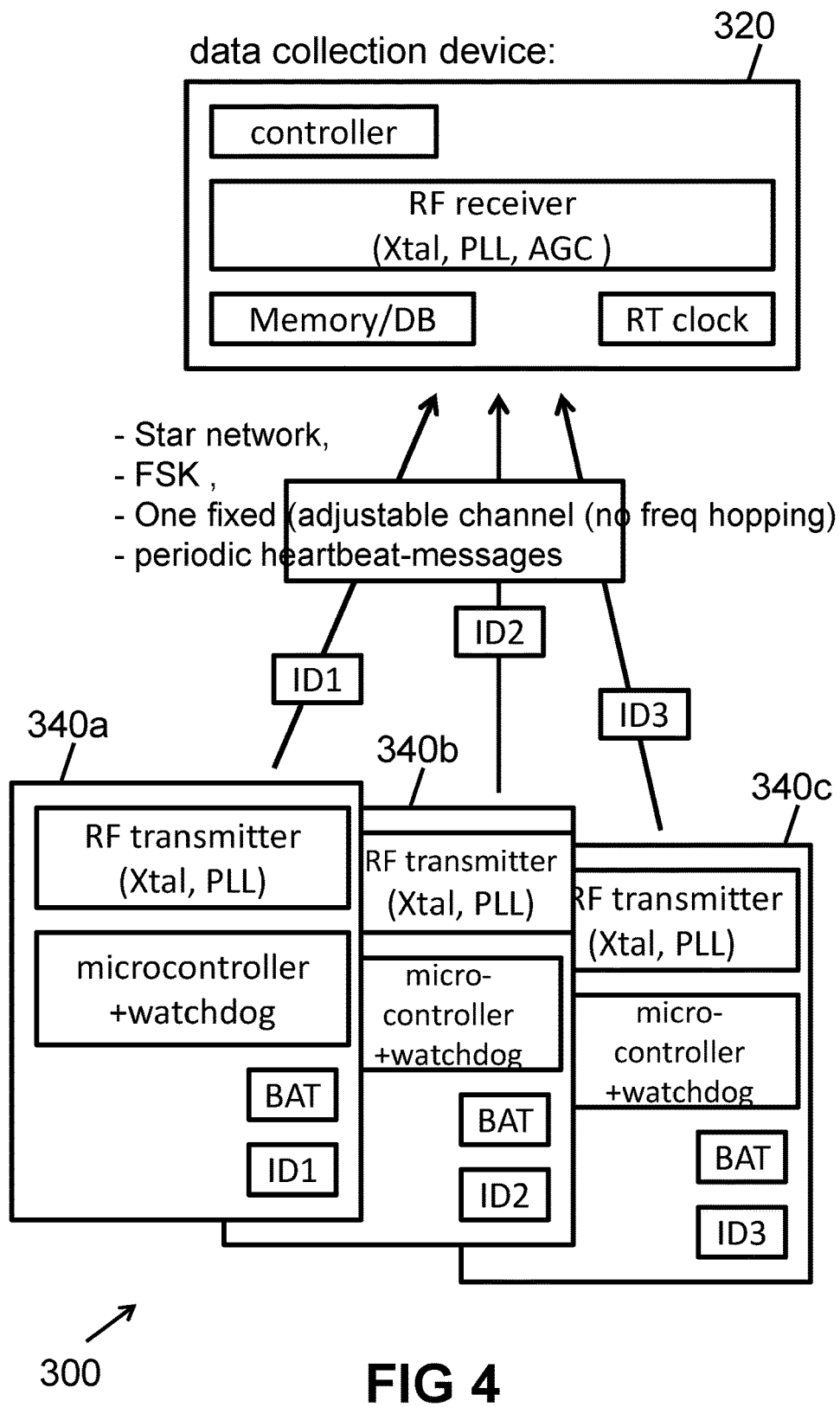
FIG. 4 shows an embodiment of a wireless monitoring system according to the present invention, with wireless signalling devices without push-button, and without movement sensor, such as can be used in a presence detection system for FIG. 1 and FIG. 2.

As will be explained in further detail with reference to, among other things, FIG. 4, FIG. 12 and FIG. 13, the problem of FIG. 1 can be solved by a wireless signalling system 300 as represented in FIG. 4, with one data collection device 320 and five portable signalling devices 340 (without movement sensor and without push-button), carried by the persons concerned.

The application of FIG. 2 focuses mainly on presence detection of the persons in an area with several buildings (for example, an office or business complex) where workers may be present in multiple buildings. Depending on the application it may or may not be of interest to know in which of the two buildings the employees are located.

As will be explained in further detail with reference to, among other things, FIG. 4, FIG. 12 and FIG. 13, the problem of FIG. 2 can be solved by, for example, providing each building with a wireless monitoring system 300 as shown in FIG. 4, each with a single data collection device 320, and a total of five portable data collection devices 340 (for example, without movement sensor and without push-button), where the signalling devices are known (for example, by 'pairing' with both the data collection devices), and where the data collection devices take into account signal strength, in case the same message coming from a certain signalling device is received by both data collection devices, in order to differentiate which of the two signals is strongest, and consequently indicate the building where this person is probably located.

The application of FIG. 3 focuses mainly on mobility measurement of one person, for example, an older living alone in an accommodation, for example, in a house or apartment or the like. In this case, it is important to know when the person is in which room, so that certain analyses can be performed that are related to, for example, their sleep behaviour or eating behaviour, and/or with their movement pattern (lots of/little movement, fast/slow movement).

Figure 5:
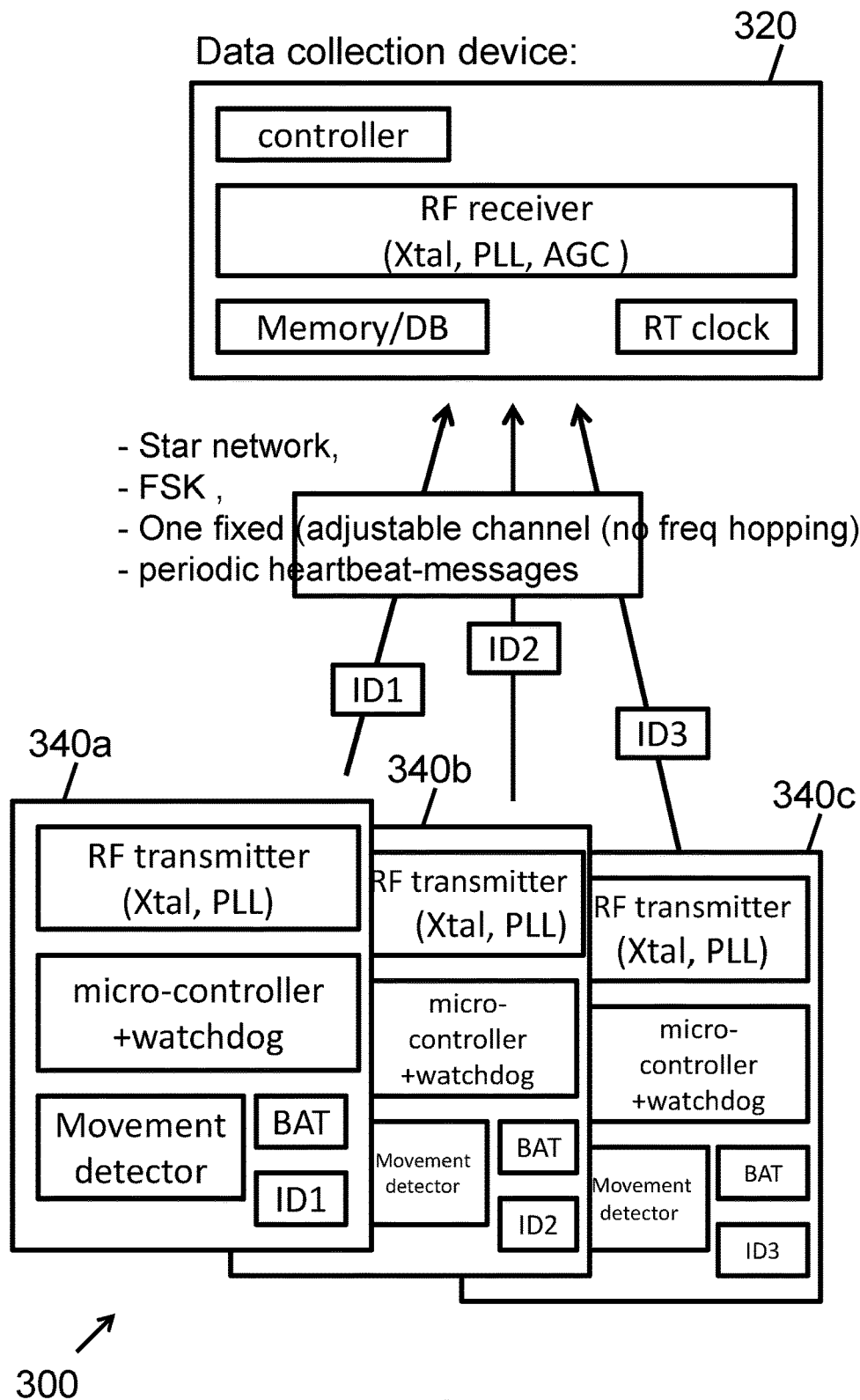
FIG. 5 shows a variant of a wireless monitoring system according to the present invention, with wireless signalling devices with movement sensor, such as can be used in a mobility monitoring system for FIG. 3.
Figure 6:
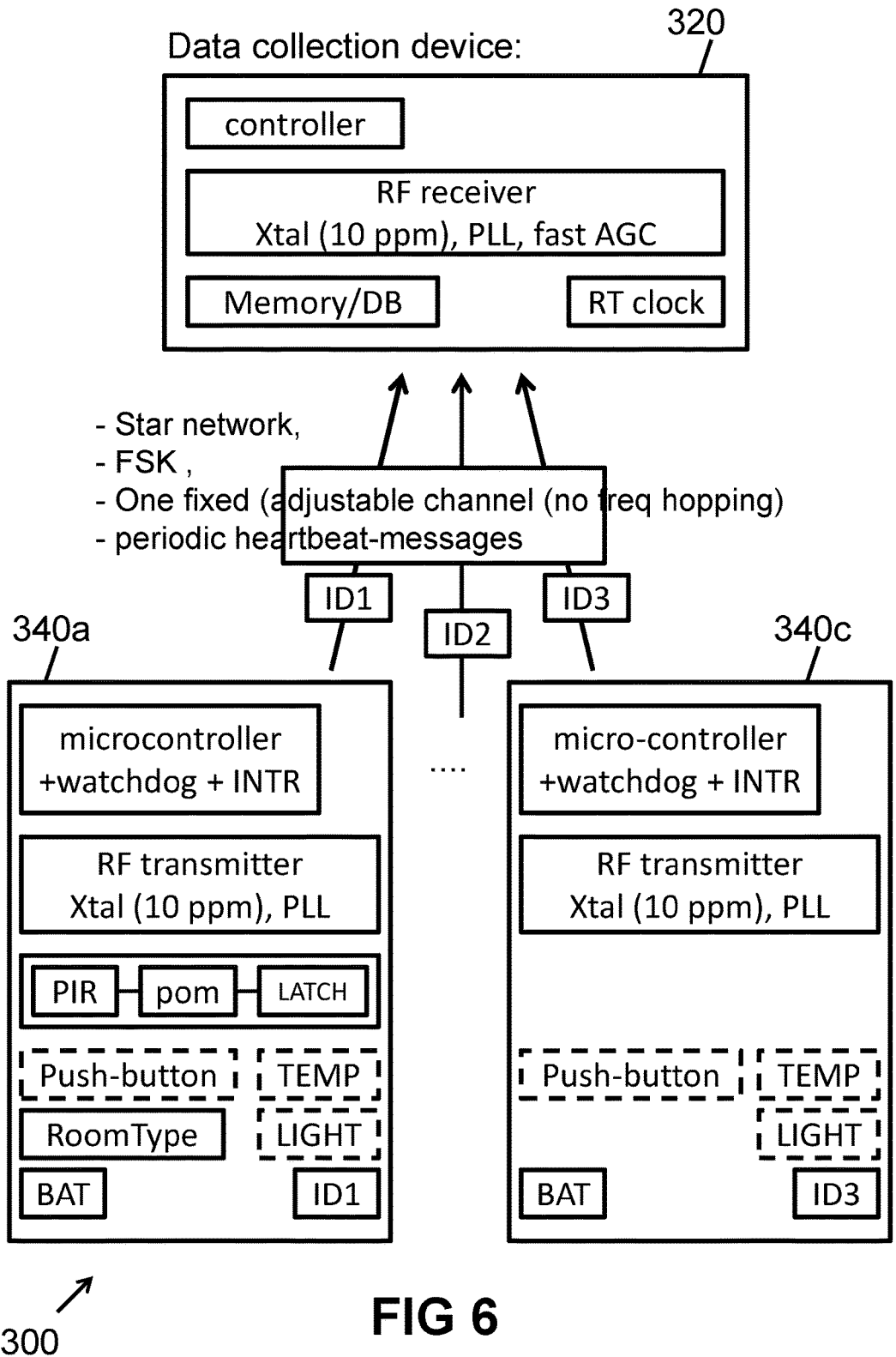
FIG. 6 shows a variant of a wireless signalling system of FIG. 5, some signalling devices including a PIR sensor and pulse converter and latch as movement sensor, and other signalling devices including a push-button, as can be used in a mobility monitoring system for FIG. 3.

As will be explained in further detail, the problem of FIG. 3 can be solved by, for example, a wireless monitoring system 300 as shown in FIG. 5 or FIG. 6, where a signalling device with movement detection is set up in each room (with or without a push-button). The person themselves need not wear a signalling device, but can do so, for example, a signalling device with a push-button, which they can use to call for help with.

One of the main general aims of the present invention is to provide a monitoring system 300 that is reliable (i.e., which provides no or virtually no erroneous data), optimally respects the privacy of the persons, and is very energy efficient, especially with regard to the energy consumption of the wireless signalling devices 340, which are fed by a battery. A minimum service life of several years must be guaranteed. For the application of FIG. 3 (mobility measurements) additional requirements are imposed, such as being able to fairly accurately measure movements (for example, to within 1 s accurate), while still being energy efficient.

The inventors had the idea to solve the stated problems in a unique way. FIG. 4 shows the main components of a wireless monitoring system 300 as proposed by the present invention, which can be used in the applications mentioned above.

The wireless monitoring system 300 comprises: a data collection device 320 and a multitude of wireless signalling devices 340 working in a star network topology, the data collection device 320 being adapted to wirelessly (via a radio link) receive data from each of the plurality of wireless signalling devices 340.

The data collection device 320 comprises among other things (see FIG. 8): a programmable controller 321 adapted to run a program that is stored in a first memory 322 (for example, a flash memory or a ROM memory, internal or external to the controller); and an RF circuit 323 (that comprises, for example, a transceiver or a receiver without transmitter, and an antenna), suitable for receiving wireless data from each of the wireless signalling devices (340); and a second memory 327 (for example, internal and/or external RAM or EEPROM or FLASH) functionally connected with the controller 321, in which data can be stored at least temporarily.

The signalling devices 340 comprise (see also FIG. 7): a programmable microcontroller 341 adapted to run a program from a memory 342 (for example, a flash memory or ROM memory, internal or external to the microcontroller), in which the microcontroller 341 has a sleep mode, and a watchdog timer to wake the microcontroller from sleep mode; an RF circuit 343 adapted to send data wirelessly to the data collection device 320; and a local battery 355 for power supply. Each signalling device has a unique ID value ID1, ID2, ID3, etc., stored in a non-volatile memory, for example, in an EEPROM 352. This value can be, for example, a 48 bit-counter value, which is stored in the EEPROM during manufacturing.

What is special about the RF circuit 323 of the data collection device 320 is that it is adapted to receive FSK modulated signals in a (preset) single channel (i.e., with one specific, presettable carrier frequency, without frequency-hopping, so without spread spectrum), and that the RF circuit comprises a sensitive and fast control circuit (with a PLL and an AGC) suitable to receive at least signals with a signal strength in the range of −80 dBm to −30 dBm (in preferred embodiments, an even greater range: from −90 dBm to −20 dBm, or even from −110 dBm to −20 dBm), and where the control circuit is able to settle within 10 ms (in preferred embodiments: in less than 5.0 ms, or even less than 2.0 ms, or even less than 1.0 ms). Preferably, signals are sent with an instantaneous power in the range of 2 mW to 50 mW, preferably from 5 mW to 20 mW, for example, approximately 10 mW, which corresponds to 10 dBm, but the sensors are adapted to effectively transmit a signal for less than 1% of the time, preferably less than 0.5% of the time, for example, less than 0.25% of the time, so the average transmitted power is very low.

Preferably, a crystal is used in both RF circuits (both of the signalling devices and of the data collection device) of approximately 30 ppm or even of approximately 10 ppm. This allows the centre frequency to be set more accurately, and a corresponding suitable bandwidth to be chosen. The single frequency band will preferably be a narrow range in one of the ISM bands, for example, a narrow band of less than 200 kHz (in preferred embodiments, even only about 70 kHz wide) in the 433 MHz band, but the 784 MHz band or the 868 MHz band or the 915 MHz band will work as well. The more accurate the frequency and the narrower the band, the greater the sensitivity, and, the lower the potential for interference from outside.

In preferred embodiments, the RF circuit 320 of the data collection device 320 is only used to receive data but not send data to the signalling devices, and the RF circuit 343 of the signalling devices 340 is only used to send messages, but not to receive data. Therefore, preferably there is no bidirectional communication (such as is the case with, for example, WiFi or ZigBee or LoRa). This allows not only the hardware and software to be made simpler, for example, because no 'handshaking' is needed, and because no AGC is needed in the signalling devices 340 (only a PLL), but it also results in very little time being lost to, for example, synchronize, and that transmission can be extremely short, because the recipient is almost always and almost immediately 'ready'. This allows a rather short synchronization pattern to be used (for example, 16 to 128 bits, preferably 48 to 80 bits, for example, 64 bits), whereby the transmission time can be shortened further. It has been found that a shorter pattern can be used if the variation with respect to the distance between the data collection device and the various signalling devices is smaller, and that a longer sync pattern should be used if this variation is greater. A person skilled in the art can choose an appropriate value depending on the intended application. In some embodiments, the length of the synchronization pattern can be adjustable, and, for example, be stored in an EEPROM of an RF-ID circuit (see below).

However, the system as described above provides a relatively large range, for example, typically in the order of 10 to 100 m, even through multiple walls. As far as known to the inventors, this combination of features (and in particular: star network, FSK, single frequency, unidirectional) is unique, and contributes to the unique advantages of the present invention. In other words, they work synergistically. In particular, they contribute to an extremely low power consumption, without significantly compromising on the transmission/reception range, and without significantly compromising on reception quality (for example, the bit error rate of the physical layer is less than 1.0%, or less than 0.5%, or even less than 0.10%, preferably even less than 0.05%).

The above-mentioned features relate mainly to RF matters for communication in a building with walls, with relatively large distances between transmitter and receiver, in which the transmitters are battery powered and have only a very low power consumption, so that they will last at least two years, and preferably longer.

Referring back to FIG. 4, it is crucial for the present invention that the microcontroller have a sleep mode (low power mode), and a watchdog timer to wake up the processor 341 from sleep mode. In the basic version of FIG. 4 (see also FIG. 12 and FIG. 13), the microcontroller 341 is programmed to set the watchdog timer to periodically wake up after a predefined first time period $\Delta T1$, for example, every 4 minutes (but a different value in the range of 1 minute to 8 minutes can also be used, for example, 2 minutes, or 3 minutes, or 4 minutes, or 5 minutes, or 6 minutes, or 7 minutes), and once it has been woken by the watchdog timer, to send a data packet 1310, 1320, 1330 to the data collection device 320 as a so-called 'heartbeat message'.

Depending on the application (such as discussed, for example, in FIG. 1 to FIG. 3), other factors such as reliability and accuracy may also play an important role. The inventors therefore went yet a step further.

To further reduce the number of errors, preferably a checksum is sent along with every packet (see FIG. 10 and FIG. 11), which allows error detection. This can, for example, be a CRC value (cyclic redundancy check), in itself known in the prior art.

Figure 10:
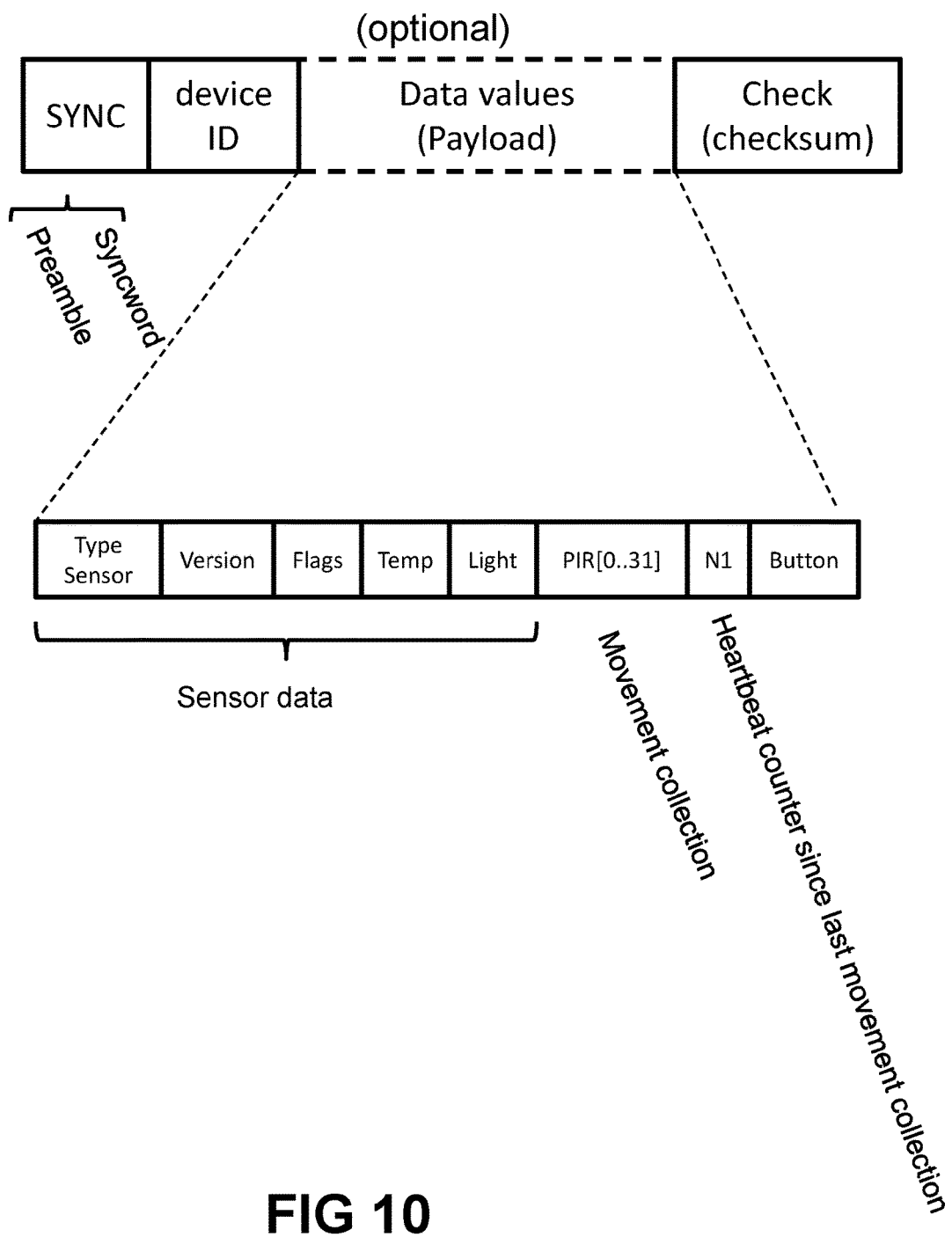
FIG. 10 and FIG. 11 show examples of data packets which can be sent by signalling devices according to the present invention.
Figure 11:
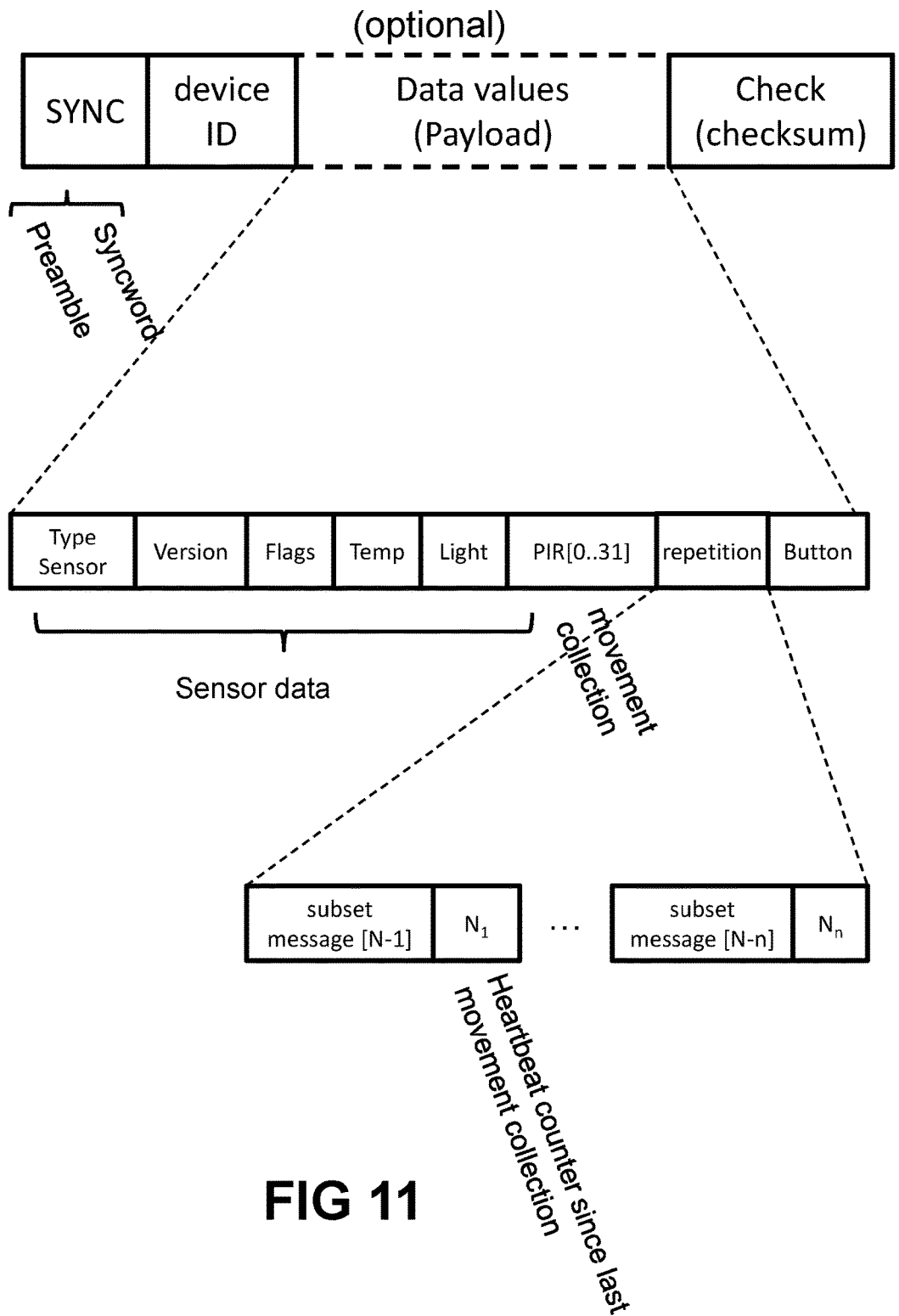

FIG. 10 shows an example of a data packet as can be sent by a signalling device 340 according to the present invention. It contains a sync pattern to allow the RF receiver 343 of the data collection device 320 to synchronize at bit and at word level, and it also contains the unique identification value 'ID' of the relevant signalling device 340. In the example of FIG. 10 and FIG. 11, the 'checksum' is at the end, but that is not absolutely necessary. In the example of FIG. 10 and FIG. 11, the packet has a fixed, predefined length, but neither is this necessary, and the packet could also have a variable length. In the latter case, an indication of the length of the packet will need to be sent along, for example, a packet type, or a byte length or such.

In preferred embodiments of the present invention, each packet has the same fixed length. As a result, the reliability further increases. This furthermore has the advantage that all messages can be stored as records with a fixed length in a memory. Such files can be easier to read/write and/or process.

For the purposes of systems such as those of FIG. 1 and FIG. 2, apart from the sync pattern and the unique ID, no other data needs to be sent, so the 'payload' data can be omitted in the basic version of FIG. 4. The data packet is preferably closed with a checksum. In variants of the minimum embodiment, additional information can of course be sent along, such as a value that indicates the type of sensor, and/or a hardware version, and/or a software version, and/or a value that shows a status of the battery (for example, the voltage of the battery), etc. The other fields listed in FIG. 10 and FIG. 11 will be discussed further.

Figure 12:
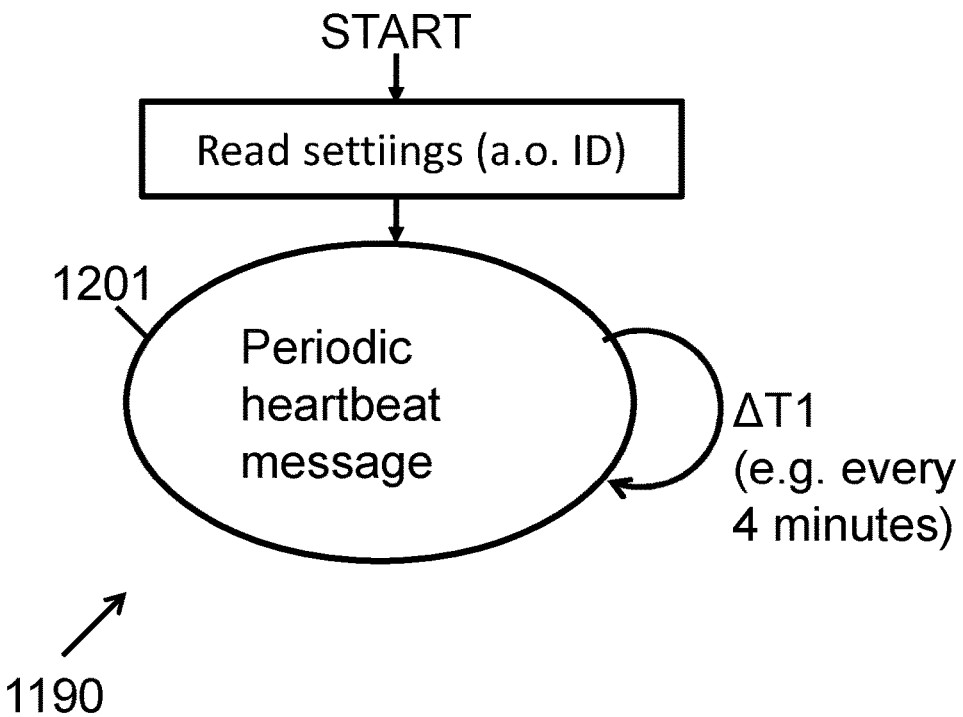
FIG. 12 shows an example of a flow diagram as can be used in embodiments of signalling devices without push-button and without movement sensor, according to the present invention.

FIG. 12 shows a possible flow diagram of the program run by the microcontroller 341. At start up (for example, when the processor is provided with voltage for the first time), settings are retrieved, for example, from the EEPROM 352, for example, the predefined frequency band, or a related value, for example, a value that is to be used to set a PLL of the RF circuit, as well as, for example, the time $\Delta T1$ (for example, 4 min., if it is implemented as adjustable value), but in any case the unique identification value ID. Once retrieved, this value can be stored in, for example, an internal memory (for example, internal RAM), so it no longer needs to be externally loaded (which costs more energy). The processor 341 can then go into a loop, in which it periodically sends a heartbeat message, and then programs the watchdog to wake up again in, for example, 4 minutes, and then go into sleep mode. The next time the microprocessor wakes up, it will send a heartbeat message again, program the watchdog again to wake up after 4 minutes, and go to sleep, etc.

In this simplest embodiment, all the microcontroller 341 of the signalling device 340 has to do is sleep more than 99% of the time, and very occasionally wake up, for example, every 4 minutes for about 20 ms, to send a heartbeat message, and reset the watchdog.

Figure 13:
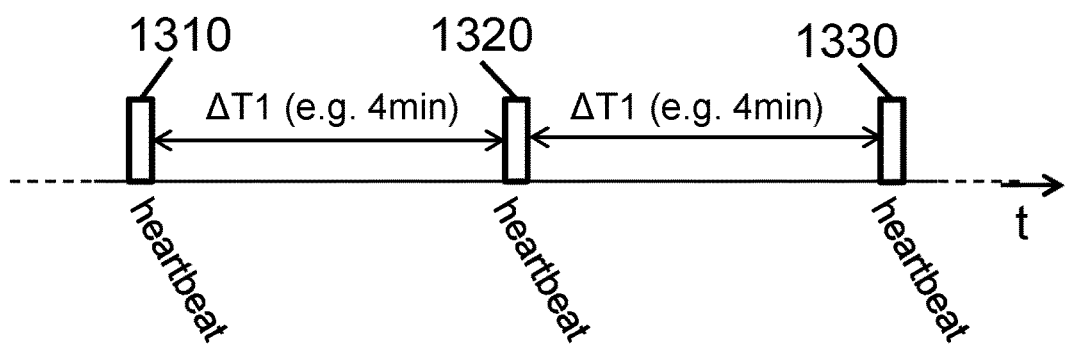
FIG. 13 shows an example of a timeline and the times at which heartbeat messages are sent according to the flow diagram of FIG. 12.

FIG. 13 shows an example of a timeline and the times at which such periodic heartbeat messages are sent according to the flow diagram of FIG. 12. Testing with multiple sensors 340 has shown that occasionally a heartbeat message will get lost, for example, due to external disturbances or collision. This should come as no surprise since all signalling devices 340 in the monitoring system 300 use the same channel. If this loss of messages is undesirable for the intended application, the problem can be solved easily by sending each heartbeat message not once, but, for example, twice in relatively quick succession, for example, once more 20 ms later (not shown in FIG. 13). In this example, the microcontroller 341 can simply remain awake an extra 20 ms. But it is of course also possible to choose a time other than 20 ms, for example, approximately, approximately 50 ms, or approximately 100 ms, or approximately 500 ms. In the latter case, it is desirable that the microcontroller 341 goes to sleep in the meantime, to reduce energy consumption. In particular embodiments, an arbitrary interval can also be used, for example, based on a measured value of the temperature, or based on a measured value of the battery voltage, or a combination thereof.

In FIG. 4 it is further shown that the data collection device 320 is preferably further equipped with a real-time clock 328 (see also FIG. 8), and preferably the processor 321 is adapted to provide the received packets with a timestamp before (temporarily or permanently) storing them in the memory or the database 327. Thanks to the star network, and the almost instantaneous communication (without intermediate 'repeaters') between each signalling device 340 and the data collection device 320, a real-time clock can be avoided on each of the signalling devices 340, without any loss of information (at least some of the intended applications can handle a delay in the order of less than 500 ms), which benefits the cost price and the power consumption.

FIG. 5 shows a variant of a wireless monitoring system 300 according to the present invention. Comparison of FIG. 5 with FIG. 4 shows that the main difference (at least in terms of hardware) is that the signalling devices 340 of FIG. 5 also have a movement sensor. All of the above relating to the system of FIG. 4, particularly with regard to the baseband part and the RF part, is also applicable to the system of FIG. 5.

FIG. 14 to FIG. 18, however, show that the software functions totally different.

Figure 14:
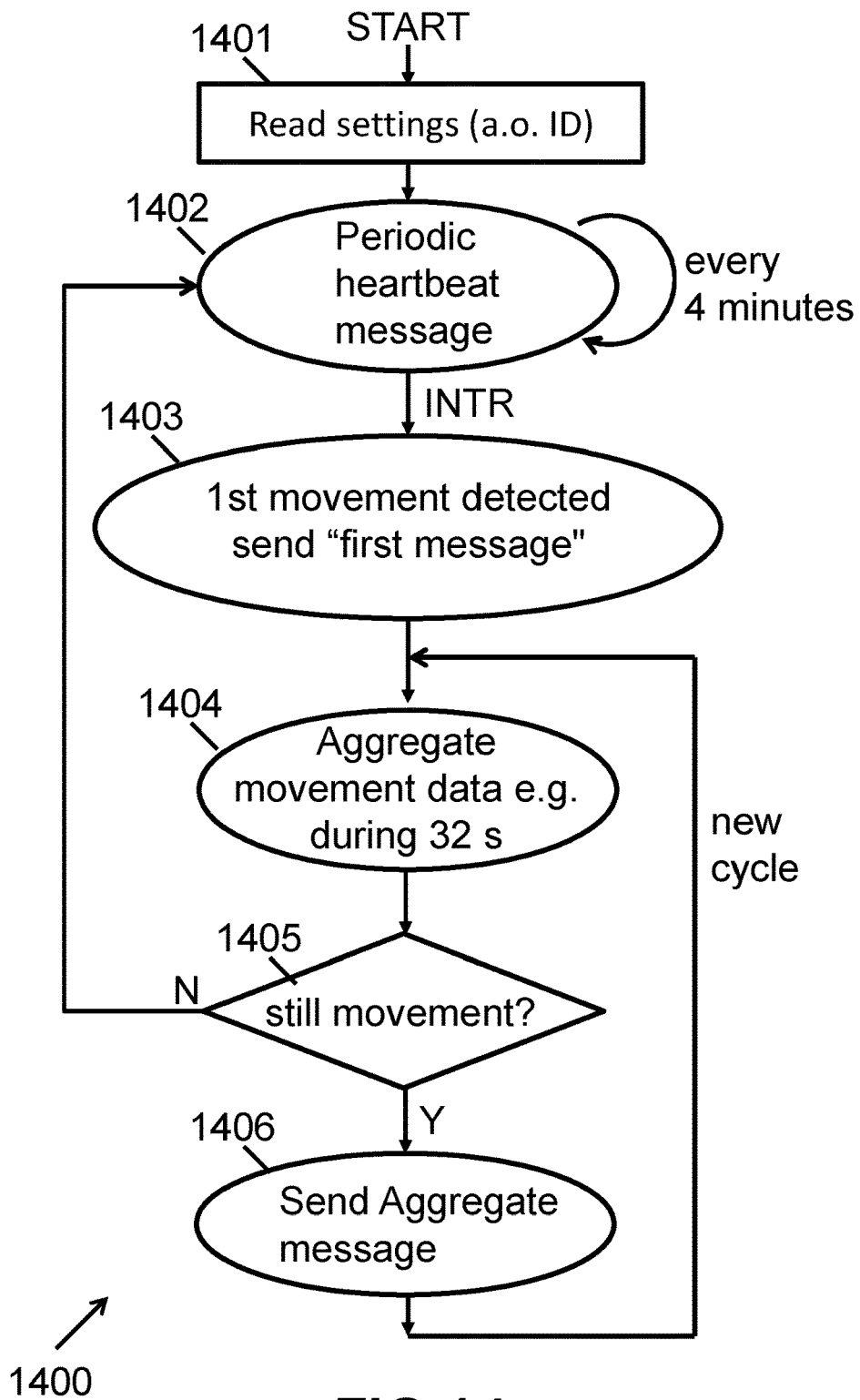
FIG. 14 shows an example of a flow diagram as can be used in embodiments of signalling devices with movement sensor but without push-button, according to the present invention.

FIG. 14 shows an example of a flow diagram such as may be used in embodiments of signalling devices 340 with a movement sensor 344 but without push-button 347, as can be used in the system of FIG. 5.

The algorithm of FIG. 14 is as follows.

In step 1401, the microprocessor 341 reads one or several settings, including the unique identification value ID of the relevant signalling device, and possibly other settings, for example, the frequency band (if it is adjustable), the period ΔT1 of the heartbeat messages (for example, 4 minutes), etc. The microprocessor 341 then sets the watchdog timer, and performs the normal heartbeat routine, as has already been described in FIG. 12, therefore spending most of the time in sleep mode.

When the movement sensor 344 detects a movement, it generates an interrupt INTR to the microprocessor 341. This leaves the sleep mode, and enters state 1403, in which it switches off the interrupt in order to prevent multiple interrupts from being sent (which is very likely, since movement was just detected), and sends a 'first movement message' 1501 to the data collection device 320 via the RF circuit 343. For some applications, for example, the mobility monitoring system of FIG. 3, it is important that this 'first movement message' is transmitted as soon as possible (for example, within 500 ms, but preferably faster, for example, within 250 ms). This allows, for example, monitoring in real-time of the 'first movement', allowing, for example, someone's arrival or departure to be reported without any loss of time (for example, intrusion detection or escape detection), and/or for the proper functioning of the system to be tested efficiently (as a kind of 'diagnostics', which can be a significant advantage for the cost of remote technical support).

In contrast to some prior art applications, where a new message is sent for each additionally detected movement, the microprocessor 341 of the present invention proceeds to read out/poll the movement sensor in step 1404 for a predetermined period of time, for example, for 32 seconds (but a different time may also be used), and during every second of this records whether there was movement or not, for example, by storing one bit for each second ('0': there was no movement, '1': there was movement).

In step 1405, the microprocessor 341 checks whether at least one movement was detected during the last 32 seconds, and if this is the case, a single message will be sent in step 1406, which is referred to as a 'aggregate message', which contains movement information on the past 32 seconds, and a new 32-second cycle is started (in the example).

If no movement was found in the last 32 seconds, it returns to state 1402, in which the interrupt of the movement sensor is re-enabled, and the watchdog timer is reset to the normal heartbeat rhythm (in the example above: 4 minutes), after which the microcontroller 341 goes back into sleep mode.

FIG. 15 shows an example of the movement detections (indicated by a dot on the time axis), and the messages that are sent. Shortly after the first movement, a 'first movement message' 1501 is sent (shown with an upright bar), after which the microprocessor proceeds to read out the movement sensor during 32 s, and it records for each window of, for example, 1 second, whether or not there was movement. In the example, two additional movements were detected, as indicated by two dots. At the end of the period ΔT3, in the example 32 seconds, an aggregate message 1502 is sent, which contains, among other things, movement information of the last 32-second period. Since additional movement was detected (two dots), a new 32-second cycle is started (see arrow from 1406 to 1404 in FIG. 14), and since at least one movement was detected, another aggregate message 1503 is sent, etc. Sometime later, an aggregate message 1504 is sent, and a new 32-second cycle is started. However, no new movement is detected in this, so that no new cycle is started. The last aggregate message 1505 (without movement information) will not be sent to save energy. Thereafter, the microprocessor 341 returns to its normal heartbeat pattern as shown in FIG. 14 (see arrow from 1405 to 1402 in FIG. 14).

FIG. 6 shows a variant of the system of FIG. 5, as a preferred embodiment of a wireless monitoring system 300 which is very suitable for monitoring mobility (see FIG. 3).

A first important difference is that in this embodiment, the RF circuit 323 of both the data collection device 320 and the RF circuit 343 of the signalling devices 340 have a crystal with an accuracy of approximately 10 ppm. As a result, the RF band becomes narrower so that there is less interference, making the reception range larger, meaning the control circuit (with PLL and AGC) of the data collection device 320 can intercept even faster, and the synchronization pattern can be even shorter, so that the microprocessor 341 needs to stay awake less time, and the RF circuit needs to send less long, which is very beneficial for power consumption.

A second very important difference is that the movement sensor 344 is preferably a passive infra-red (PIR) sensor, and that the signalling device 340 further includes a pulse reshaping circuit 357 ('pom' in FIG. 6), and optionally also a latch 356.

Figure 9:
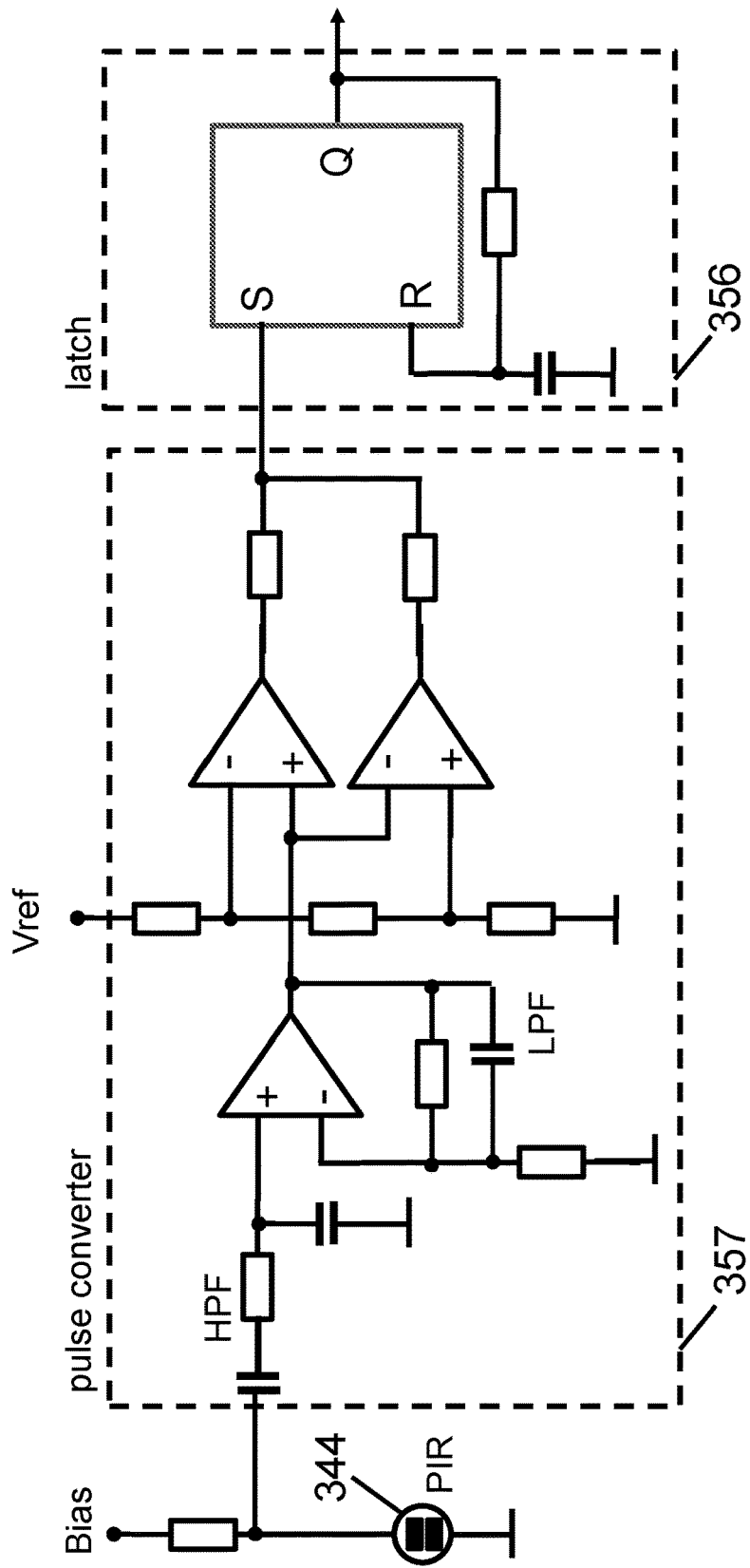
FIG. 9 shows a block diagram of a circuit with a PIR sensor and a pulse converter and a latch, such as may be used in embodiments of signalling devices according to the present invention.

FIG. 9 shows an example of a circuit in which both a pulse converter 357 and a latch 356 are provided. In the example, an SR latch 356 is shown, but another latch can also be used. The pulse reshaping circuit 357 has as its main advantage that the amplitude and the shape of the small signal from the PIR sensor 344 (typically less than 1 mV amplitude) is converted to a signal that can be provided to a digital input pin of the microcontroller 341. In this way can, for example, the polling of the PIR sensor 344 by means of an ADC from the processor can be avoided, so that a great deal of energy is saved. This input pin can, for example, be read repeatedly ('polled') by the microcontroller, or even better, this digital signal can be provided to an interrupt pin of the microcontroller 341, as a result of which it doesn't have to poll actively, but instead just sleep until an interrupt occurs. Tests have shown multiple interrupts can be generated per second as a result of this, but such a high resolution is not strictly necessary for all embodiments of the present invention.

The inventors had the idea to also provide a hardware latch 356. The latch 356 has as biggest advantage that the microcontroller 341 then doesn't need to actively poll during the cycle in which movement events are gathered (step 1404 of FIG. 14, corresponding to the 32-second periods of FIG. 15), but that it can also spend the largest portion of these 32-second periods in sleep mode, and yet still be able to detect that movement events occurred in the meantime (admittedly with a resolution of 1 second in this example, but it will be clear that this operating principle will likewise apply to a higher resolution, for example, a resolution of 500 ms or a lower resolution, for example, 1,500 ms or 2,000 ms, depending on the specific application). This aspect will now be further explained with reference to FIG. 16 and FIG. 18, for embodiments where the latch 356 is present.

FIG. 16 and FIG. 17 show in more detail an example of the first and subsequent seconds of FIG. 15, when the signalling device 340 includes a pulse converter 357 and a latch 356. In that case, step 1404 can be implemented as a repetition of, for example, 32 iterations of each 1 s, during which there is no need to actively poll, but where the latch only has to be read out once after every second, and then reset again to erase the previous detections. As shown in FIG. 16, this allows the microcontroller 341 to spend most of its time in sleep mode, while still being able to determine whether there was movement in the last 32-second period or not (albeit with a resolution of, for example, 1 second, although this was also the case above). Of course, a different time period than 32 seconds can be chosen, and a different resolution than 1 second can be chosen, without prejudice to the principles of the present invention.

FIG. 17 shows the period of 1 second to 2 seconds of FIG. 15 in more detail. The main difference between FIG. 16 and FIG. 17 is that in FIG. 16 the interrupt is turned off, and the 'first movement message' 1501 is sent, as soon as possible after detection of the 'first movement'. This allows, for example, it to be determined very accurately when a particular person enters a building and/or room. Preferably, the 'first movement message' is repeated once or twice (see shading in FIG. 16), because this is an important message for certain applications (for example, mobility determination). The steps of FIG. 17 also apply to the period from 2 seconds to 3 seconds, and from 3 seconds to 4 seconds, etc.

FIG. 18 shows in more detail what happens at the end of the 32-second period that follows sending the aggregate message 1504 (which was the last aggregate message in which movement was still detected). This is partly consistent with step 1405 of FIG. 14. Because no movement was detected in the last 32 seconds, no 32-second cycle is started, and the last packet 1505 is not sent. After activating the interrupt, and setting the watchdog timer, the microcontroller 341 goes back into sleep mode, and returns to the 'normal heartbeat pattern' of FIG. 12 and FIG. 13 (state 1402 in FIG. 14).

Figure 19:
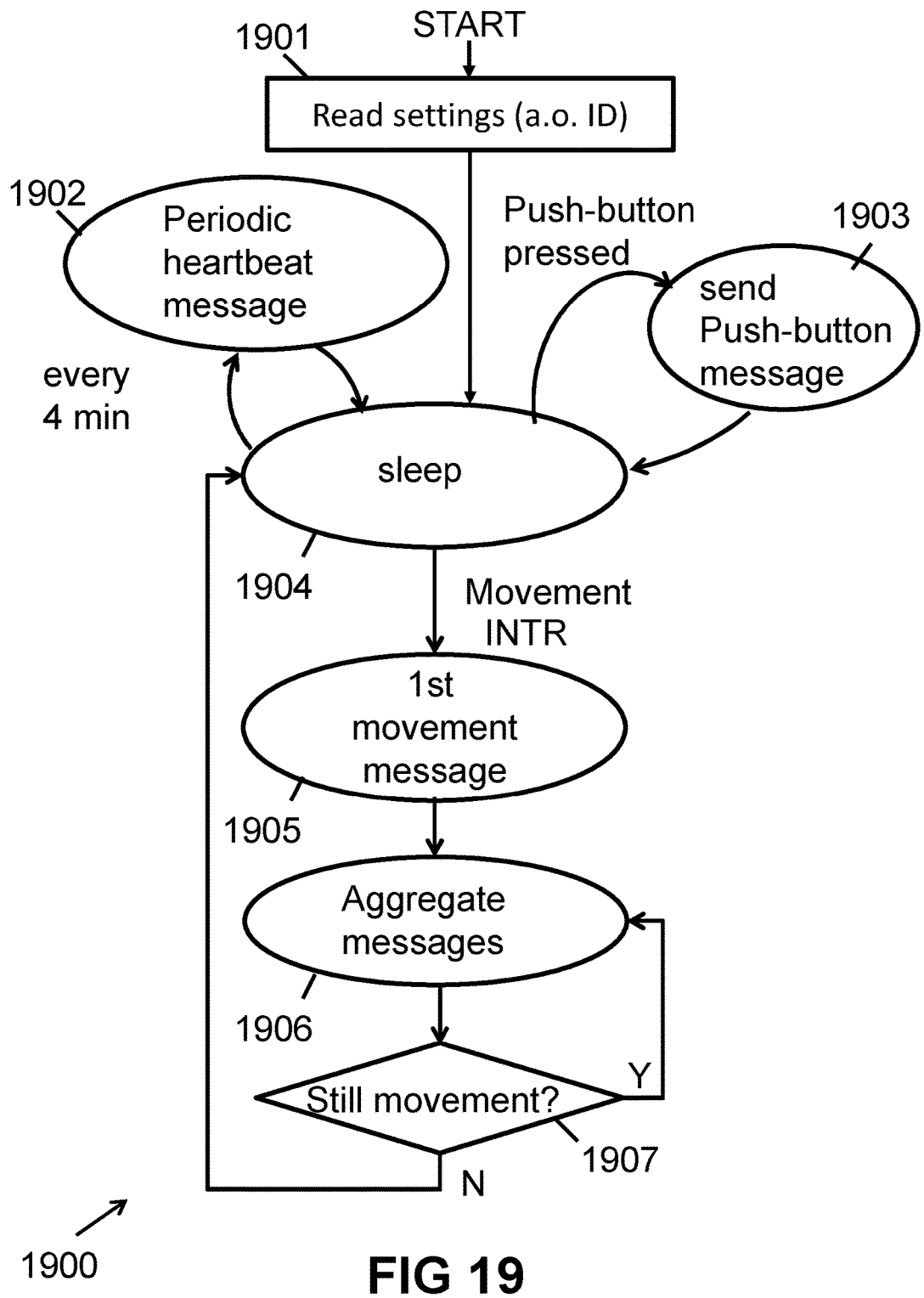
FIG. 19 shows an example of a flow diagram as can be used in embodiments of signalling devices with movement sensor and with a push-button, according to the present invention.

Not shown in FIG. 14 and FIG. 19, but applied in a preferred embodiment of the present invention, is that the last movement collection (i.e. the movements such as sent in message 1504) in which at least one movement was determined, is repeated in each heartbeat message. This allows the time of the last movement in a particular room to be calculated in retrospect. Since the heartbeat messages have to be sent by each signalling device 340 anyway, this offers the advantage that these messages are repeated automatically, making the chance that the information about the 'last movement' is lost (for example, by collisions) particularly small. The data collection device 320 does need to know how often this message was already repeated, so that it can deduct the period of 4 minutes as many times. To this end, a counter N1 is sent along by the signalling device 340. The heartbeat message could look, for example, as shown in FIG. 10. The counter N1 is the heartbeat counter since the last movement collection was sent (message 1504 in FIG. 15). On the basis of this counter N1, the data collection device 320 can count back how many periods of 4 minutes have already have passed, and it should add 32 s to this (of the last period of 32 s without movement). By looking at the last '1' bit in the field 'PIR[0 . . . 31]' it can determine when the last movement was detected with up to 1 second accuracy. This is defined as the time when the person left the room.

But variations of this are also possible, such as, for example, shown in FIG. 11. In this case, the last movement collection (i.e. the movements as sent in message 1504) in which at least one movement was established is repeated in the very next message, together with a relative time (expressed by a counter value N1, for example, on the basis of a local RC clock) between the two messages. This also allows the time of the last movement in a particular room to be calculated in retrospect. Since the heartbeat messages have to be sent by each signalling device 340 anyway, this offers the advantage that these repetitions never occur later than after 4 minutes, so that the chance that the information about the 'last movement' will be lost due to collisions and the maximum delay will decrease is particularly small. The data collection device 320 does need to know how much time passed between an original message and its repetition. To this end, a counter Ni is sent along by the signalling device 340 per repetition.

A message with repetition could look, for example, as shown in FIG. 11. Message N contains a copy of the most useful data from message N-1, in particular, the movement data (in the example, referred to by 'PIR[0 . . . 31]'). The counter N1 contains the relative time to the last transmitted message. On the basis of this counter N1, the data collection device 320 can count back to when the message N-1 was sent. This allows both the content and message sending time of N-1 to be reconstructed if it gets lost. In particular, for the data in message N-1, it is also possible to determine when the last movement was detected with up to one second accuracy. This is, for example, important in case a person left the room just before packet N-1 was sent. Should packet N-1 be lost, the exact moment of leaving the room would be lost. The repetition allows it to be reconstructed perfectly.

Of course, this principle can be expanded. Thus, message N can also repeat useful data from messages N-2, N-3, etc. In this case, even for multiple successive lost packets, the movement information can still be reconstructed perfectly. For example, in a particular implementation it is possible to choose to have each movement collection sent a maximum of two times. Referring to the example of FIG. 15, this would mean that:

the message 1501 sends the 'first movement' (for example, at time T0),
the message 1502 sends the collection from T0 to T0+32 s,
the next message 1502' (not shown) sends the collection
   from T0+32 s to T0+64 s plus a first repeat of the
   movement data from T0 to T0+32 s (already sent in
   message 1502). Basically, this message therefore contains the movement data from T0 to T0+64 s, the next message 1502" (not shown) sends the collection from T0+64 s to T0+96 s plus a second repeat of the movement data from T0 to T0+32 s (already sent in message 1502, and repeated a first time in message 1502'), plus a first repeat of the movement data from T0+32 s to T0+64 s (already sent in message 1502').

Basically, this message therefore contains the movement data from T0 to T0+96 s, the next message 1502''' (not shown) sends the collection from T0+96 s to T0+128 s plus a second repeat of the movement data from T0+32 s to T0+64 s (already sent in message 1502', and repeated a first time in message 1502"), plus a first repeat of the movement data from T0+64 s to T0+96 s (already sent in message 1502").

Basically, this message therefore contains the movement data from T0+32 s to T0+122 s, etc.

It is noted that in this case the last counter reflects how long ago the first 'movement event' started. On the basis of this counter value and the last movement collection, the time of the 'first movement' and the 'final movement' can be counted back to, even if the direct messages 1501 (and the repeat 1501') and message 1502 to 1504 would be lost. These repetitions therefore make the system particularly robust against the loss of particular messages, without significantly increasing the power consumption.

Alternatively, the movement collections can be repeated in the same way as the 'first movement message', for example, by repeating each aggregate message 1502, 1503, etc. one time or two times, for example, after 20 ms or after 50 ms (in the same manner as discussed above for repeating the 'first movement message'). This has the advantage that the counters N1, N2, etc. are not necessary, that the messages can be shorter, that the movement information of the past 32 s is available faster, but have the disadvantage that the battery empty faster because of the extra transmissions. A person skilled in the art can take an appropriate decision based on the requirements of the intended application.

Figure 7:
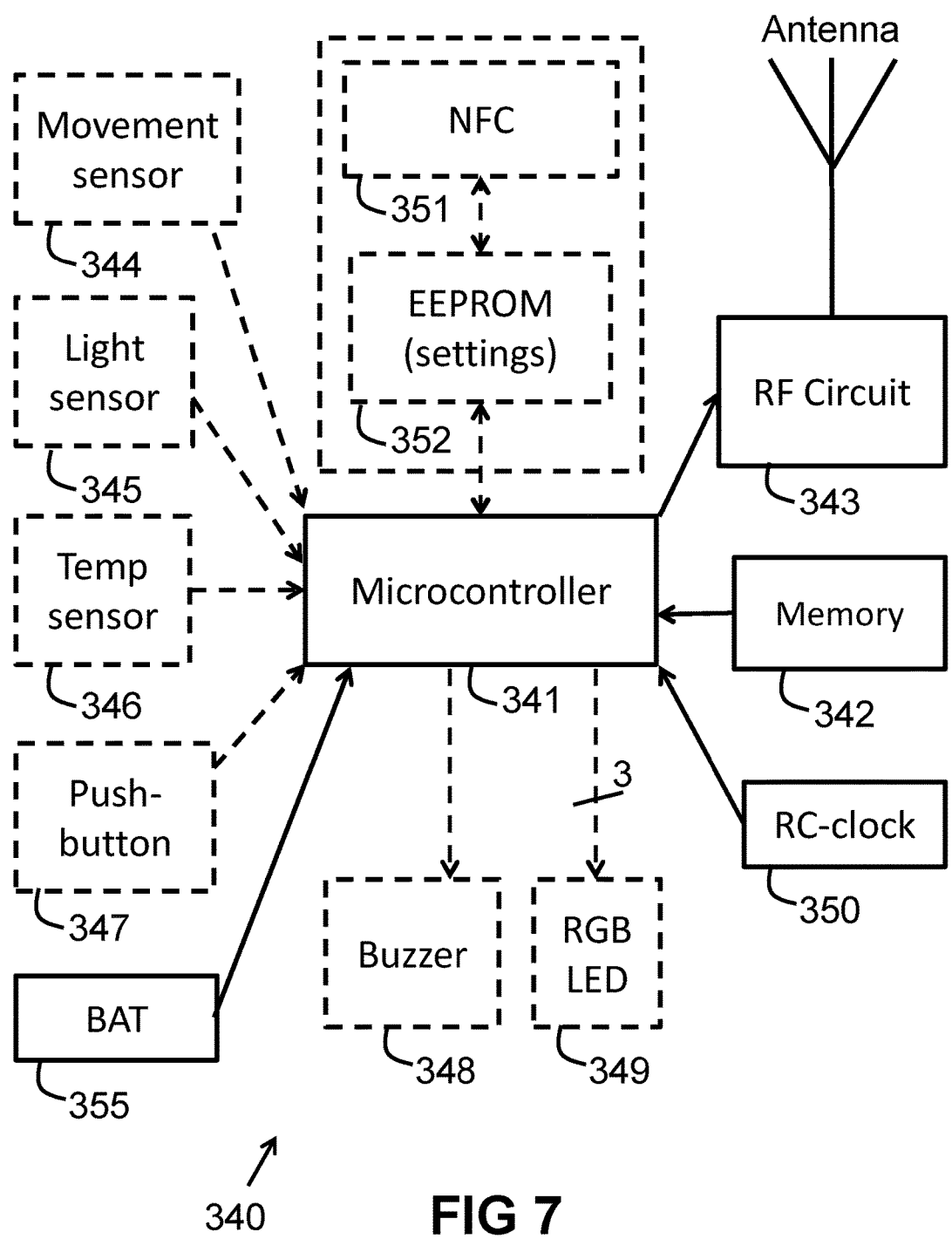
FIG. 7 shows a block diagram of a wireless signalling device according to embodiments of the present invention.

Referring back to FIG. 6, in addition to the PIR sensor and pulse converter and optional latch, the signalling device 340a can also include a push-button 347 (see also FIG. 7). The point of this push-button is that the signalling device 340, when the push-button is pressed, as soon as possible sends a 'push-button message' to the data collection device 320 to indicate that the push-button was pressed. An example of such a message is shown in FIG. 10 and FIG. 11; in particular, the last field 'button' allows indicating that the button was pressed. In the monitoring application of FIG. 3, this push-button message can, for example, be sent on to a family member. In this way, the person being monitored can, for example, call in the 'help' of a family member.

FIG. 19 is a possible flow diagram for a signalling device 340 which includes both a push-button 347 and a movement sensor 344. FIG. 19 is a variation of the flow diagram of FIG. 14. The main difference is that in this case the push-button 347 preferably can also provide an interrupt signal to the microcontroller 341, which, when the push-button is pressed, when the microcontroller in sleep mode, will send a message to the data collection device 320. The latter can if desired send the message, or a similar message, to, for example, a mobile phone or a smartphone of a family member.

Variations on this are also possible. For example, push-button presses can also be processed when the microprocessor is in the above-mentioned 32-second period. When pressing the push-button, the microcontroller can, for example, temporarily leave the 32-second period, and send the current status of the movement collection, along with an indication that the push-button was pressed.

FIG. 6 further shows that the signalling devices 340 can have a setting 'RoomType', which can be very useful in the case of signalling devices 340 with a movement sensor 344 for the mobility application of FIG. 3. Indeed, in the preferred embodiment, the end user can themselves set the room type, for example, by means of dip switches, or by means of an NFC writer, or by pressing the push-button according to a predetermined sequence, or in any other way. The room type can include, for example, 6 bits to indicate the place (for example: 1='kitchen', 2='living room', 3='bedroom', 4='toilet', etc.) where this signalling device 340 will be set up. These bits are preferably sent along with each data packet of these signalling devices. It allows that the processor that performs the analysis of the data (for example, the processor of the data collection device itself, or a remote server 370), immediately knows in what type of room a certain movement took place, without having to look up the room that belongs to this unique ID in some kind of table. This can greatly increase the efficiency of data processing, and reduce the complexity.

FIG. 6 further shows that the signalling device 340a can optionally also have a light sensor 345 and a temperature sensor 346. This will be further explained on the basis of FIG. 7.

FIG. 6 shows (bottom right) that the system 300 of FIG. 6 can not only work with signalling devices 340a that all include a movement sensor, but can also work with signalling devices 340c that do not include a movement sensor and no push-button (as already discussed in FIG. 4), but can also work with signalling devices that do not include a movement sensor but only a push-button, and a mixture of such signalling devices 340.

Figure 20:
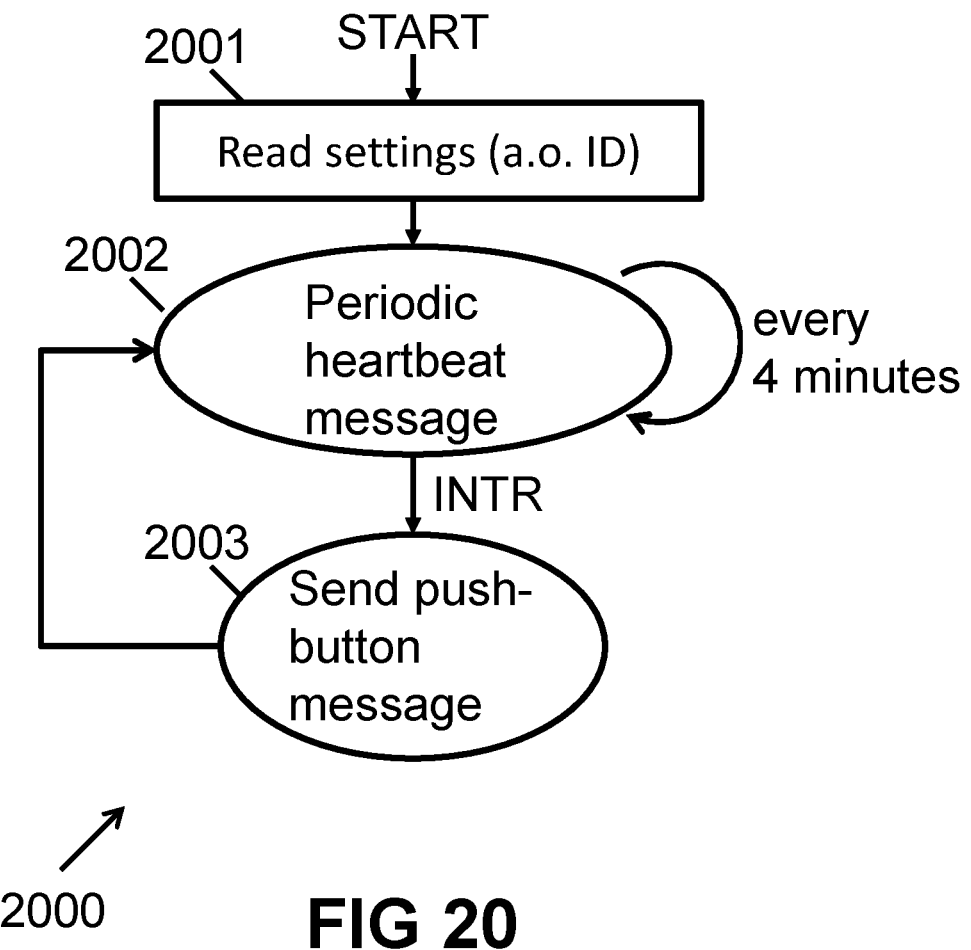
FIG. 20 shows an example of a flow diagram as can be used in embodiments of signalling devices without a movement sensor but with a push-button, according to the present invention.

FIG. 20 shows a possible flow diagram for the microprocessor 341 of a signalling device with a push-button 347 but without movement sensor 344.

FIG. 7 shows a block diagram of a wireless signalling device 340 according to embodiments of the present invention. As already mentioned above, one or more elements, particularly the movement sensor 344 and/or the push-button 347, may or may not be present. The signalling device 340 optionally also includes a temperature sensor 346. If it is present, the microprocessor 341 can read out a temperature, and send the read out value, or a value that is related to it, for example, a digitized version of it, along with some or all data packets, for example, with the heartbeat messages. This can be especially useful in a system for mobility monitoring, for example, in order to explain certain behaviours of the person being monitored.

The signalling device 340 optionally also includes a light sensor 345. If it is present, the microprocessor 341 can read out a light value, and send the read out value, or a value that is related to it, for example, a digitized version of it, along with some or all data packets, for example, with the heartbeat messages or with the movement messages. This can be especially useful in a system for mobility monitoring, for example, to see if the person is walking around at night without putting the lights on.

Optionally, the signalling device also includes a buzzer 348 for confirmation to the user that the push-button 347 (if present) was pressed, and a push-button message was sent. Alternatively or in combination therewith, a light signal can be displayed to confirm this pressing and sending.

Optionally, the signalling device 340 also includes a Near-Field-Communication circuit (NFC) 351, preferably with an internal EEPROM 352. The above-mentioned settings (such as unique ID, selected channel band, the room type, time ΔT1, for example, 4 minutes, time ΔT2, for example, 1 second, time ΔT3, for example, 32 seconds, and the like) can be set in this. The EEPROM can be a dual port EEPROM, which can be written to via NFC (for example, by using a NFC writer from an external device, for example, a smartphone, equipped with appropriate software, also referred to as an 'app'), or by an NFC writer of the data collection device 320 (if present). The microcontroller 341 can, for example, be connected with this EEPROM via a I2C interface. An advantage of using NFC to write to the EEPROM is that then, when configuring the signalling device 340, no power is consumed from the local battery, but that the necessary power is provided by a spool of the NFC circuit.

Figure 8:
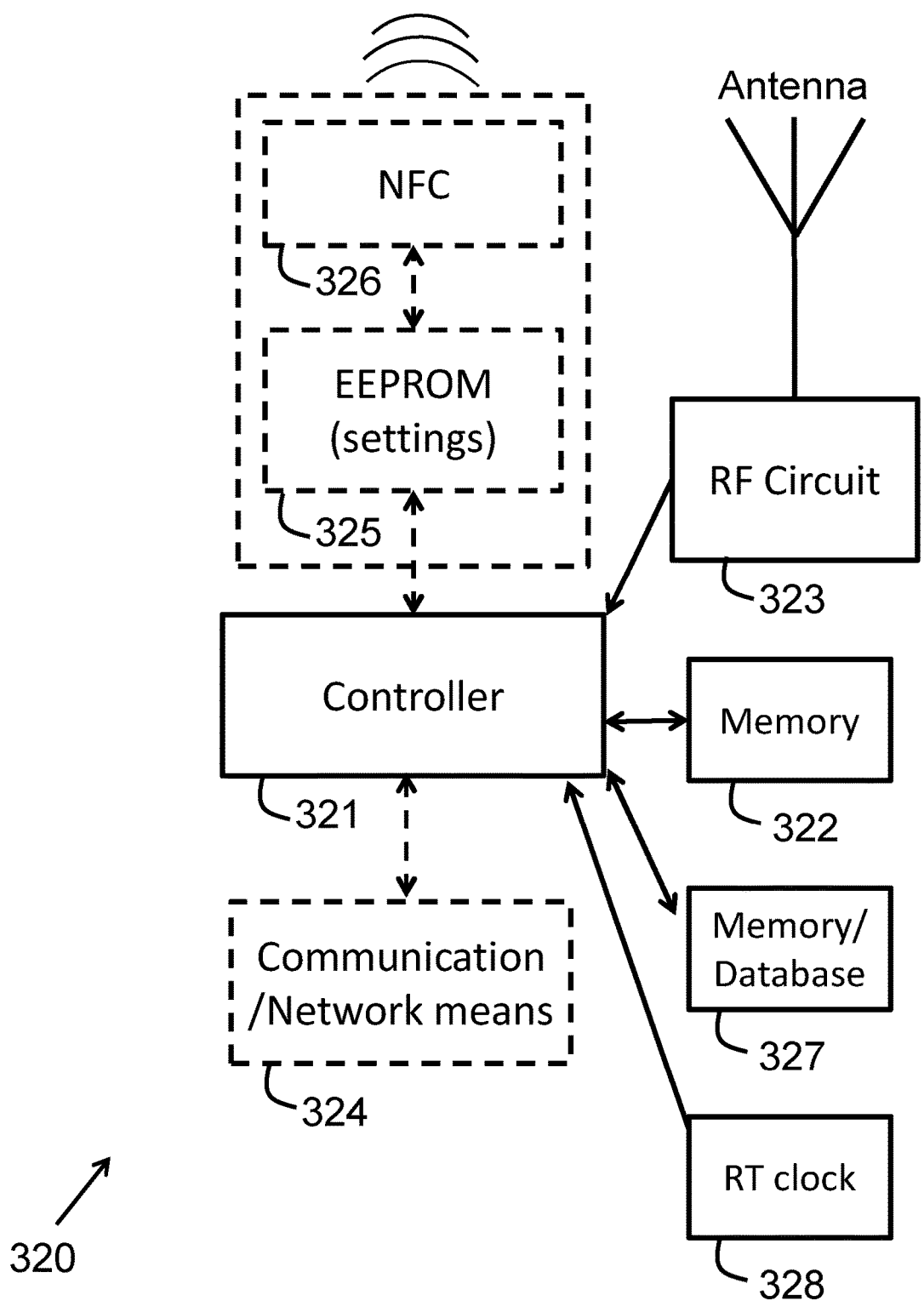
FIG. 8 shows a block diagram of a data collection device according to embodiments of the present invention.

FIG. 8 shows a block diagram of a data collection device 320 according to embodiments of the present invention. Most components have already been described above, apart from communication or network means 324.

Figure 23:
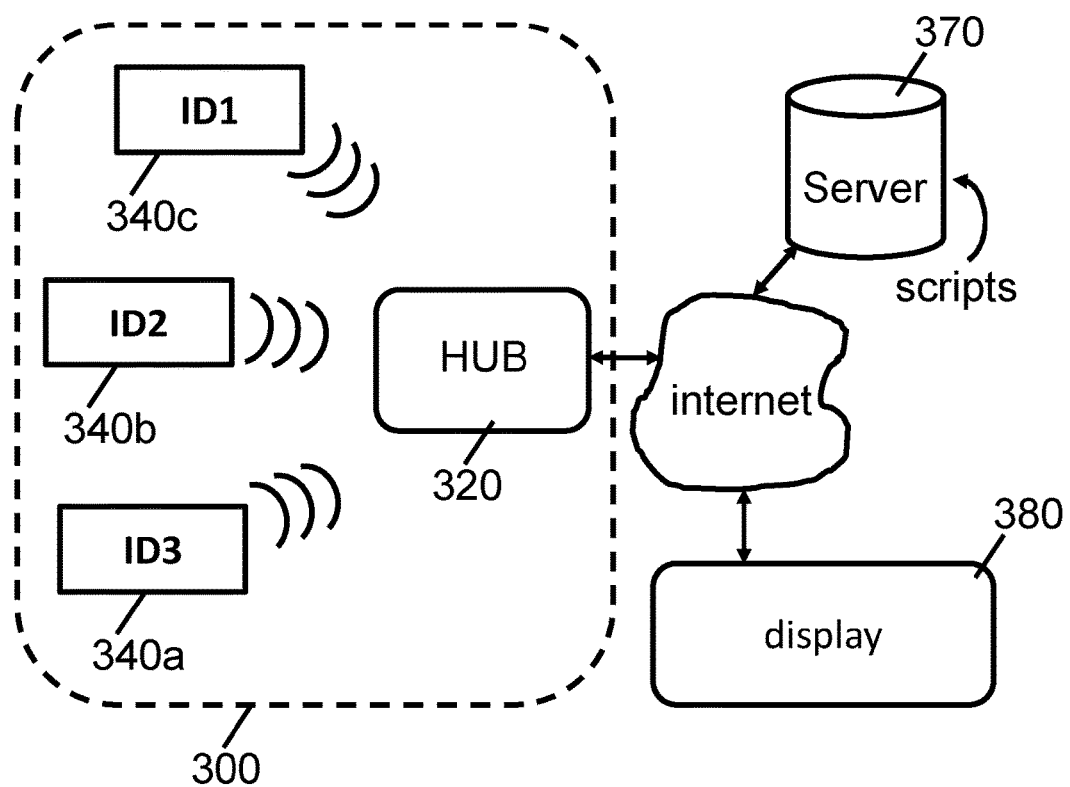
FIG. 23 shows an example of a presence detection system according to embodiments of the present invention.

The communication or network means 324 can, for example, be means (wired or wireless, direct or indirect) to send the collected data to a remote server 370 (see FIG. 23 and FIG. 24), for further analysis. The example of FIG. 23 relates to a presence detection system, and the analysis software can, for example, comprise the processing of messages, to detect at what time a particular person arrived in the building, and at what time the person left the building. The example of FIG. 24 relates to a mobility monitoring system, and the server 370 (if present), may, for example, include analysis software to analyze the messages, to determine how long the monitored person stayed in a particular room. The server may make the result of the analysis available on, for example, a website (for example, in the first example, for the HR department of a company), or in the second example, for a family member. If desired, the data can be encrypted, in order to increase privacy.

But instead of carrying out such analysis on a server, in some embodiments the analysis can also be performed by the controller 321 of the data collection device 320 itself. In this case, the means of communication can be, for example, a GPRS or UMTS connection, so that the controller 341 can send the results of the analysis directly to one or more visualisation devices, for example, a smartphone or a tablet of a family member.

Figure 21:
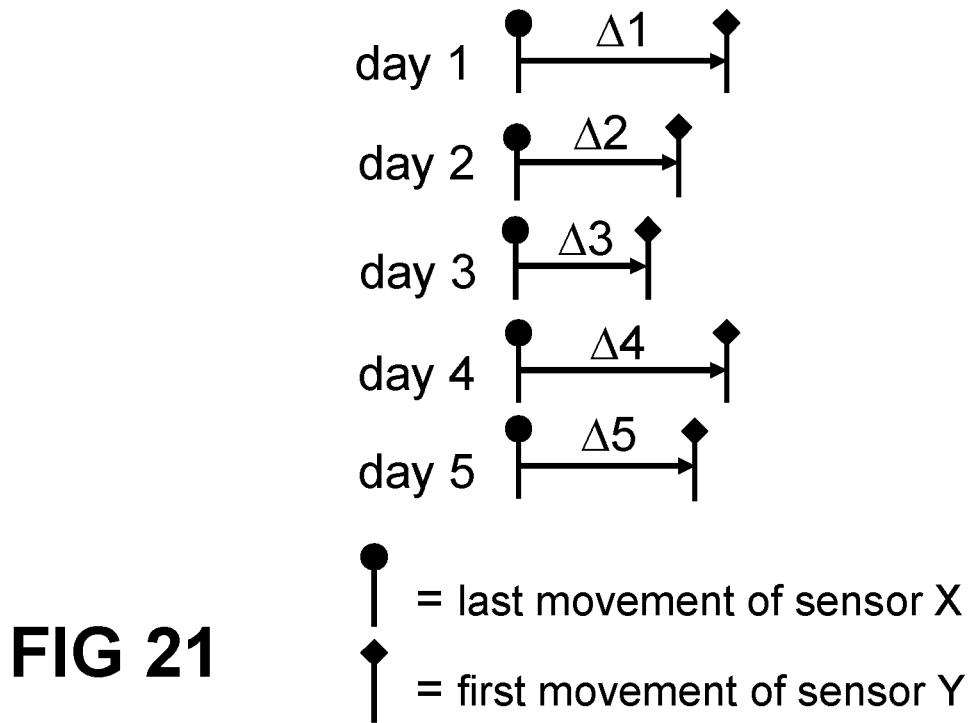
FIG. 21 shows an example of how a mobility value can be calculated.

FIG. 21 illustrates an example of how a specific mobility value can be calculated by the analysis software of a mobility system. As explained above, a movement, detected by a movement sensor 344, is almost immediately sent on (in the form of a 'first movement message') to the data collection device 320, where it receives a timestamp. Thus, the time of the 'first movement' of a particular sensor X is known, and almost instantly (for example, within 500 ms). As also explained above, it is possible to determine the time of the 'last movement event' of another sensor Y based on the last aggregate message 1504 that still contains movement information (if this message is transmitted), or if this packet is lost, based on repetitions in subsequent messages. By determining the time T1 of the last movement detected by signalling device X with a movement sensor, which is located, for example, in the living room, and the time T2 of the 'first' movement detected by another signalling device Y with a movement sensor, which is located, for example, in the bedroom, the analysis software can determine how long the person needed to travel from the living room to the bedroom. Of course, the necessary filtering should be applied in case the person did not go directly from the living room to the bedroom, but such filtering algorithms are known, and therefore do not need to be discussed further.

FIG. 21 thus shows a first mobility value as the time needed to go from the living room to the bedroom. This value can be calculated for each day, and can, for example, be averaged out per day, per week or per month, or over any other period. In a similar way, other mobility values can be calculated, for example, the time needed to go from the living room to the bathroom, the duration of a toilet visit or bathroom visit, etc.

It is an advantage of the present invention that times are calculated needed to move from one room to another. On the basis of this information the analysis software can make an estimate of the distance between certain groups, and/or that certain rooms are located on a single floor, and/or that certain rooms are interconnected with the door. This in any case allows that the user does not have to enter a 'floor plan' on some kind of website.

Figure 22:
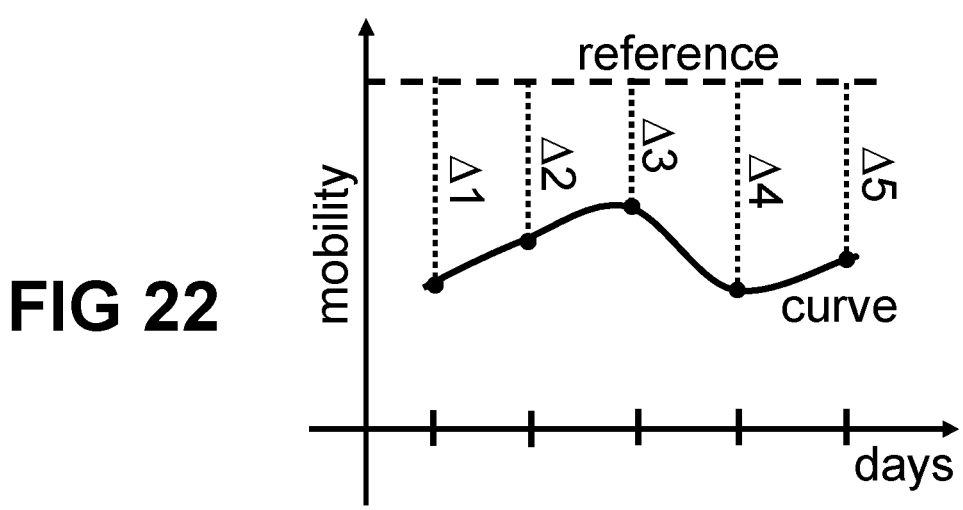
FIG. 22 shows an example of how a mobility change can be displayed based on the time.

FIG. 22 shows an example of a chart in which these mobility values are set out as a factor of time; in the example, over 5 days. This allows mobility variations to be displayed graphically. Of course, these values can also be averaged out and displayed over several weeks or months or even years.

Figure 24:
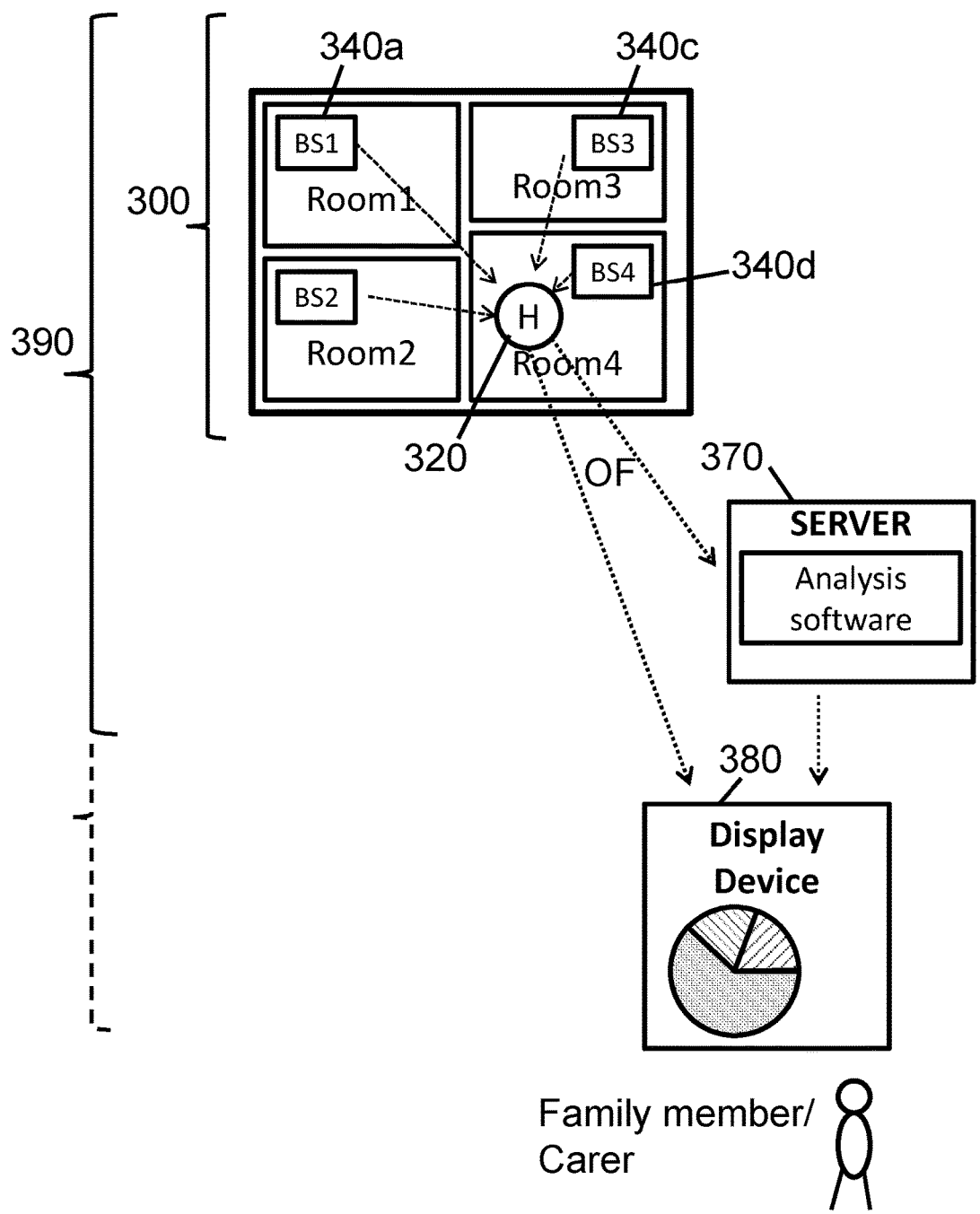
FIG. 24 shows an example of a mobility monitoring system according to embodiments of the present invention.

FIG. 24 shows an example of a mobility monitoring system according to the present invention, wherein a wireless monitoring system 300 is active in a building for the measurement of movement events. In the example shown, the system 300 contains one data collection device 320 and four signalling devices 340 with a movement sensor. Each of these signalling devices is set up in a specific room, and sends messages to the data collection device 320, which provides the messages with a timestamp, and either analyses them itself, or sends them on to a server 370 for further processing. The result of the analysis can subsequently be sent on to one or more display devices 380, for example, a PC or a laptop or a notebook or a smartphone or a tablet of a family member.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

The invention claimed is:

1. A wireless monitoring system for the monitoring of at least one person in a building, the wireless monitoring system comprising a data collection device and a plurality of wireless signalling devices working in a star network topology, the data collection device being adapted to wirelessly receive data that is sent by each of the plurality of wireless signalling devices;

wherein the signalling devices and the data collection device are adapted to send and receive FSK modulated signals and wherein the signalling devices are adapted to send data packets to the data collection device, wherein the signalling devices and the data collection device are adapted to send and receive the FSK modulated signals with a predetermined single carrier frequency and with a bandwidth that is smaller than 200 kHz, and that the signalling devices are adapted to send a heartbeat message to the data collection device.

2. A wireless monitoring system according to claim 1, the data collection device being further provided with means to determine a signal strength of the signals sent by the signalling devices.

3. A wireless monitoring system according to claim 1, the building having multiple rooms, and at least some of the signalling devices further including a movement sensor adapted to detect a movement, and when the movement is detected, send a movement signal to a microcontroller, which in turn sends the data packet to the data collection device to signal this movement.

4. A wireless monitoring system, according to claim 1, at least some of the signalling devices further including a push-button, adapted to provide a push-button signal to a microcontroller, and the microcontroller being adapted to, when the pushbutton is pressed, send the data packet to the data collection device to register the pressing of the push-button.

5. The wireless monitoring system according to claim 1, each wireless signalling device comprising a microcontroller that is adapted to send the data packet to the data collection device, the data packet further including a checksum, and the data collection device comprising a controller, the controller of the data collection device being adapted to verify the checksum, and, if the checksum is incorrect, ignore the message.

6. The wireless monitoring system according to claim 1, the signalling device being adapted to repeat urgent data packets one or more times.

7. The wireless monitoring system according to claim 1, the data collection device further including a real-time clock, and the data collection device comprising a controller which is further adapted to apply a timestamp to received data packets, based on a value obtained from the real-time clock, and the controller being further adapted to store the timestamped data packets at least temporarily in a memory or database.

8. The wireless monitoring system according to claim 1, further having a plurality of customisable settings, including a room type to indicate what kind of room a particular wireless signalling device should be set up in.

9. The wireless monitoring system according to claim 1, the single carrier frequency being a predetermined portion of an ISM band, with the bandwidth smaller than 200 kHz.

10. The wireless monitoring system according to claim 1, the wireless signalling device comprising a microcontroller that is adapted to measure a value of a local battery, and to send a value related to this measured value of the battery along in at least some heartbeat messages.

11. The wireless monitoring system according to claim 1, the wireless signalling device further comprising a light sensor, and the wireless signalling device comprising a microcontroller that is adapted to read out a light intensity value from the light sensor, and the microcontroller being further adapted to send a value related to the light intensity value to the data collection device.

12. The wireless monitoring system according to claim 1, the wireless signalling device further comprising a temperature sensor, and the wireless signalling device comprising a microcontroller that is adapted to read out a temperature value from the temperature sensor, and the microcontroller being further adapted to send a value related to the temperature value to the data collection device.

13. The wireless monitoring system according to claim 1, the wireless signalling device further comprising a housing comprising a PCB, the PCB being mounted in a movable manner inside the housing, and a movement sensor being mounted on a front side of the PCB and sticking out at least partly past the housing, and the push-button including a spring, and a push-button being mounted on a back side of the PCB in front of part of the housing, in such a way that, when a force is applied to the movement sensor, the push-button is pressed down, and when no force is applied to the movement sensor, the push-button is not pressed down.

14. The wireless monitoring system according to claim 1, the signalling device including a movement sensor which is a passive infra-red (PIR) sensor, and the wireless signalling device further comprising a pulse reshaping circuit arranged between the PIR sensor and a microcontroller, the pulse reshaping circuit being adapted to receive a signal from the PIR sensor in the event of a movement event, and adapted to generate a pulse signal to an input pin of the microcontroller, and the microcontroller, when it is in sleep mode, being adapted to wake up when the pulse signal appears on the input pin.

15. The wireless monitoring system according to claim 14, the microcontroller being further adapted to send a first movement message to the data collection device to signal the movement event, and the data collection device being adapted to receive that first movement message and to timestamp it before storing it at least temporarily in a memory or database.

16. The wireless monitoring system according to claim 15, the microcontroller being further adapted to transmit at least one additional movement message for reporting the first movement event, with each additional transmission taking place with a predetermined interval following the transmission of the first movement message;
   and each additional movement message comprising a first counter or other indication of the total time period between the transmission of the relevant additional movement message and the occurrence of the first movement event;
   and the data collection device being adapted to receive the additional movement messages and to provide them with a timestamp, and to store them at least temporarily in a memory or database.

17. The wireless monitoring system according to claim 16, the pulse reshaping circuit further including a latch, and the microcontroller being further adapted to, after sending the last sent additional movement message, switch off an interrupt related to the input pin connected to the pulse reshaping circuit, and perform the following steps in a cycle of a predetermined number of iterations:
   set a watchdog timer to wake up after a second time period,
   upon awakening after this second time period, read out the latch and determine whether new movement events occurred during the past period of time, and temporarily store a result of this determination in a memory,
   reset the latch again, set the watchdog timer again with the second time period, and then to go back into a sleep mode,
   and the microcontroller being further adapted to optionally send the collected amount of data together in one aggregate message, and the microcontroller being further adapted to determine whether at least one movement event has taken place in the cycle, and if at least one movement event has occurred, to start a new cycle, and if no movement event has occurred, to reset the watchdog timer with the first time period, activate the interrupt related to the input pin connected to the pulse reshaping circuit again, and again go into sleep mode.

18. The wireless monitoring system according to claim 17, the microcontroller of the wireless signalling device being further adapted to send in the heartbeat message the data of the most recent cycle in which the movement event occurred, along with a counter value indicating how often this aggregate data was already sent.

19. The wireless monitoring system according to claim 17, the microcontroller of the wireless signalling device being further adapted to send in the subsequent aggregate message the data from the most recent cycle in which the movement event occurred, together with a counter value indicating the time relative to the last message.

20. A presence detection system for determining a presence of persons in a building, comprising:
 a wireless monitoring system according to claim 1;
 a computer unit provided with software to analyse the heartbeat messages to detect which persons are present in the building, on the basis of a difference between a current time, and a time of the last received heartbeat message.

21. A presence detection system for determining a presence of persons in an area with at least two buildings,
 each building comprising a wireless signalling system according to claim 2, so that the presence detection system comprises at least two data collection devices;
 the presence detection system further comprising a computer unit provided with software to analyse the heartbeat messages to detect which persons are present in at least one of the two buildings,
 and if the same heartbeat message is received by the at least two data collection devices, to determine the most probable location taking into account the received signal strengths.

22. A mobility monitoring system for determining mobility or mobility changes of a person who lives in a building with several rooms, comprising:
 a wireless monitoring system according to claim 1;
 a computer unit equipped with analysis software for the analysis of the movement events detected by the data collection device, the analysis software being adapted to calculate one or more mobility values on the basis of a time difference between a final movement detected by a first wireless signalling device and a first movement detected by a second wireless signalling device, different from the first wireless signalling device; and
 communication or network means for sending the one or more mobility values to at least one display device.

23. A mobility monitoring system according to claim 22, wherein the wireless signalling device comprises at least one movement sensor.

* * * * *